(12) United States Patent
Miyazaki

(10) Patent No.: US 11,993,103 B2
(45) Date of Patent: May 28, 2024

(54) PNEUMATIC TIRE

(71) Applicant: Toyo Tire Corporation, Itami (JP)

(72) Inventor: Tetsuji Miyazaki, Itami (JP)

(73) Assignee: TOYO TIRE CORPORATION, Itami (JP)

( * ) Notice: Subject to any disclaimer, the term of this patent is extended or adjusted under 35 U.S.C. 154(b) by 0 days.

(21) Appl. No.: 17/975,018

(22) Filed: Oct. 27, 2022

(65) Prior Publication Data
US 2023/0135475 A1    May 4, 2023

(30) Foreign Application Priority Data
Oct. 29, 2021    (JP) .................................. 2021-177023

(51) Int. Cl.
*B60C 11/13*    (2006.01)
*B60C 11/03*    (2006.01)

(52) U.S. Cl.
CPC ... *B60C 11/1369* (2013.01); *B60C 2011/0355* (2013.01); *B60C 2011/0369* (2013.01); *B60C 2011/1338* (2013.01); *B60C 2011/1361* (2013.01)

(58) Field of Classification Search
CPC .................. B60C 11/13; B60C 11/1369; B60C 2011/1338; B60C 2011/1361; B60C 2011/1353; B60C 11/1384; B60C 11/1392
See application file for complete search history.

(56) References Cited

U.S. PATENT DOCUMENTS

| | | | |
|---|---|---|---|
| 6,668,886 B1 * | 12/2003 | Iwamura | B60C 11/1218 152/902 |
| 8,844,590 B2 | 9/2014 | Kiwaki | |
| 2005/0076986 A1 * | 4/2005 | Saguchi | B60C 11/11 152/209.21 |
| 2008/0149242 A1 * | 6/2008 | Oyama | B60C 11/047 152/209.19 |
| 2012/0080130 A1 | 4/2012 | Scheuren | |
| 2014/0246134 A1 * | 9/2014 | Hironaka | B60C 11/24 152/154.2 |

(Continued)

FOREIGN PATENT DOCUMENTS

| | | | |
|---|---|---|---|
| JP | 2005053257 | * | 3/2005 |
| JP | 5304127 B2 | | 10/2013 |

(Continued)

*Primary Examiner* — Cedrick S Williams
*Assistant Examiner* — Thomas Frank Schneider
(74) *Attorney, Agent, or Firm* — WHDA, LLP

(57) ABSTRACT

A tire has a tread including: a first circumferential groove which is closest to a center in a tire width direction among a plurality of circumferential grooves; center land portions placed adjacent to the first circumferential groove at a side near the center in the tire width direction, and a lug groove which extends between a plurality of the center land portions, and which opens to a side near the first circumferential groove. A bridge having a bottom surface which is bulged is formed at a portion of the lug groove near the first circumferential groove. The bridge has a cross-sectional shape of a trapezoid with tapered surfaces in which side surfaces of the lug groove at an end near a center in a longitudinal direction and an end near the first circumferential groove are inclined with heights thereof reduced toward corresponding ends of the bridge.

4 Claims, 22 Drawing Sheets

(56) References Cited

U.S. PATENT DOCUMENTS

2016/0152094 A1\* 6/2016 Kagimoto ........... B60C 11/1384
152/209.24
2020/0156415 A1\* 5/2020 Orii ....................... B60C 11/047

FOREIGN PATENT DOCUMENTS

| JP | 5922364 B2 | 5/2016 |
| KR | 200303656 Y1 \* | 11/2002 |

\* cited by examiner

PNEUMATIC TIRE

CROSS REFERENCE TO RELATED APPLICATION

This application claims priority to Japanese Patent Application No. 2021-177023 filed on Oct. 29, 2021, which is incorporated herein by reference in its entirety including the specification, claims, drawings, and abstract.

TECHNICAL FIELD

The present disclosure relates to a pneumatic tire, and in particular to a pneumatic tire having a tread including a plurality of circumferential grooves and a lug groove.

BACKGROUND

In the related art, pneumatic tires are known which have a tread including a plurality of circumferential grooves and a plurality of lug grooves (for example, JP 5922364 B). In the tire disclosed in JP 5922364 B, a reinforcement bar (a raised portion) is provided on a bottom surface of a center portion of a lug groove between blocks that are adjacent in a tire circumferential direction, and an upper surface of the raised portion is inclined such that a height thereof is reduced from one side in the tire circumferential direction toward the other side. With this configuration, advantages of traction and energy distribution are maintained even when wearing of the tread becomes more serious.

On a tire on which a center land portion is placed adjacent to a first circumferential groove at the center portion in the tire width direction of the tread, a configuration may be considered in which, in order to improve rigidity of the center land portion, a bridge having a bottom surface which is bulged is formed at a portion, of the lug groove which extends in a tire width direction in the center land portion and which opens to the side of the first circumferential groove, near the first circumferential groove. However, depending on a rotation of the tire in the circumferential direction, there is a possibility that, due to the presence of the bridge, water drainage performance at the center portion in the tire width direction will be significantly reduced. When the reinforcement bar is provided on the bottom surface of the lug groove of the center land portion as in the tire disclosed in JP 5922364 B also, there is a possibility that the water drainage performance will be similarly significantly reduced.

An advantage of the present disclosure lies in provision of a pneumatic tire in which reduction of the water drainage performance at the center portion in the tire width direction can be suppressed while the rigidity of the center land portion can be improved, and dependence on the tire rotational direction can be suppressed.

SUMMARY

According to one aspect of the present disclosure, there is provided a pneumatic tire comprising a tread including: a first circumferential groove which is closest to a center in a tire width direction among a plurality of circumferential grooves formed along a tire circumferential direction; center land portions placed adjacent to the first circumferential groove at a side near the center in the tire width direction; and a lug groove which extends from a first side in the tire width direction toward a second side between a plurality of the center land portions and which opens to a side near the first circumferential groove, wherein a bridge having a bottom surface which is bulged is formed at a portion of the lug groove on a side near the first circumferential groove, and the bridge has a cross-sectional shape of a trapezoid with tapered surfaces in which side surfaces of the lug groove on an end near the center in a longitudinal direction and an end near the first circumferential groove are inclined with heights thereof reduced toward corresponding ends of the bridge.

According to the pneumatic tire described above, because the bridge is provided on the lug groove of the center land portion, the rigidity of the center land portion can be improved. Further, during travel of a vehicle on a wet road surface, even when the tire rotates in a direction such that water flows from the first circumferential groove closer to the center in the tire width direction to the lug groove of the center land portion, the water can be easily caused to flow from the first circumferential groove to the lug groove. With this configuration, a pneumatic tire can be realized in which the reduction of the water drainage performance at the center portion in the tire width direction is suppressed while rigidity of the center land portion is improved, and the dependence on the tire rotational direction are suppressed.

According to the pneumatic tire of an aspect of the present disclosure, the water drainage performance at the center portion in the tire width direction can be suppressed while the rigidity of the center land portion can be improved, and dependence on the tire rotational direction can be suppressed.

BRIEF DESCRIPTION OF DRAWINGS

Embodiment(s) of the present disclosure will be described based on the following figures, wherein.

DESCRIPTION OF EMBODIMENTS

A pneumatic tire according to an embodiment of the present disclosure will now be described in detail with reference to the drawings. The embodiment described below is merely exemplary, and the present disclosure is not limited to the embodiment described below. Further, selective combination of various constituent elements of a plurality of embodiments and alternative configurations described below is within the scope of the present disclosure.

In the present disclosure, terms are used such as a wet road surface, a snowy road surface, and a dry road surface. The wet road surface refers to a road surface which is wet due to rain water or the like, and a road surface which is wet due to melting of snow and ice. The snowy road surface refers to a road surface covered with snow. The dry road surface refers to a dry road surface without snow or ice. In the following, for convenience of explanation, the wet road surface and the snowy road surface may be collectively called "snow-ice road surface". In addition, in the following description, a traveling performance on an icy road surface (ice performance) will not be particularly described, but the pneumatic tire according to an embodiment of the present disclosure has superior ice performance, in addition to superior wet performance, superior snow performance, and superior dry performance.

Figure 1:
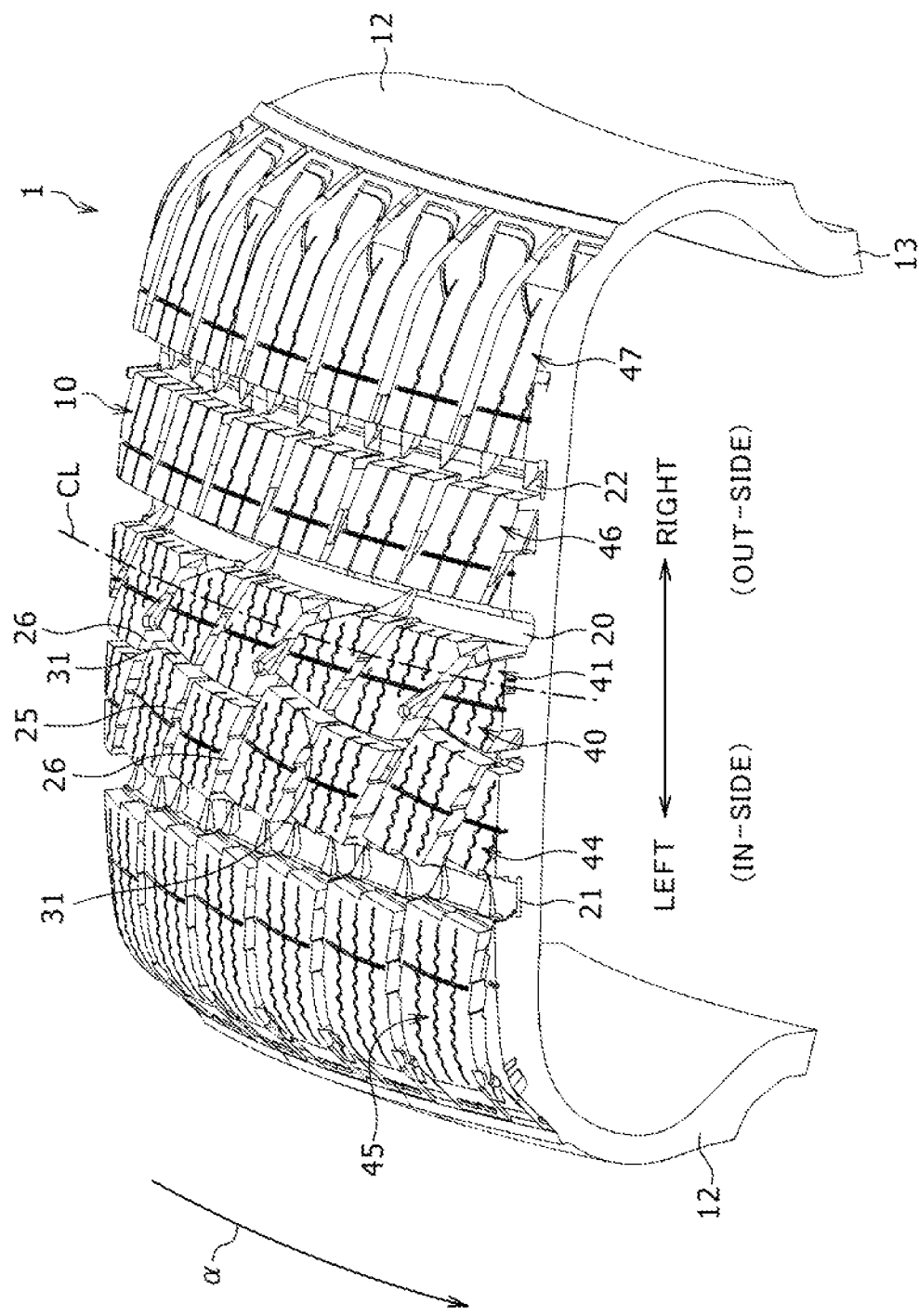
FIG. 1 is a perspective diagram of a pneumatic tire according to an embodiment of the present disclosure.
Figure 2:
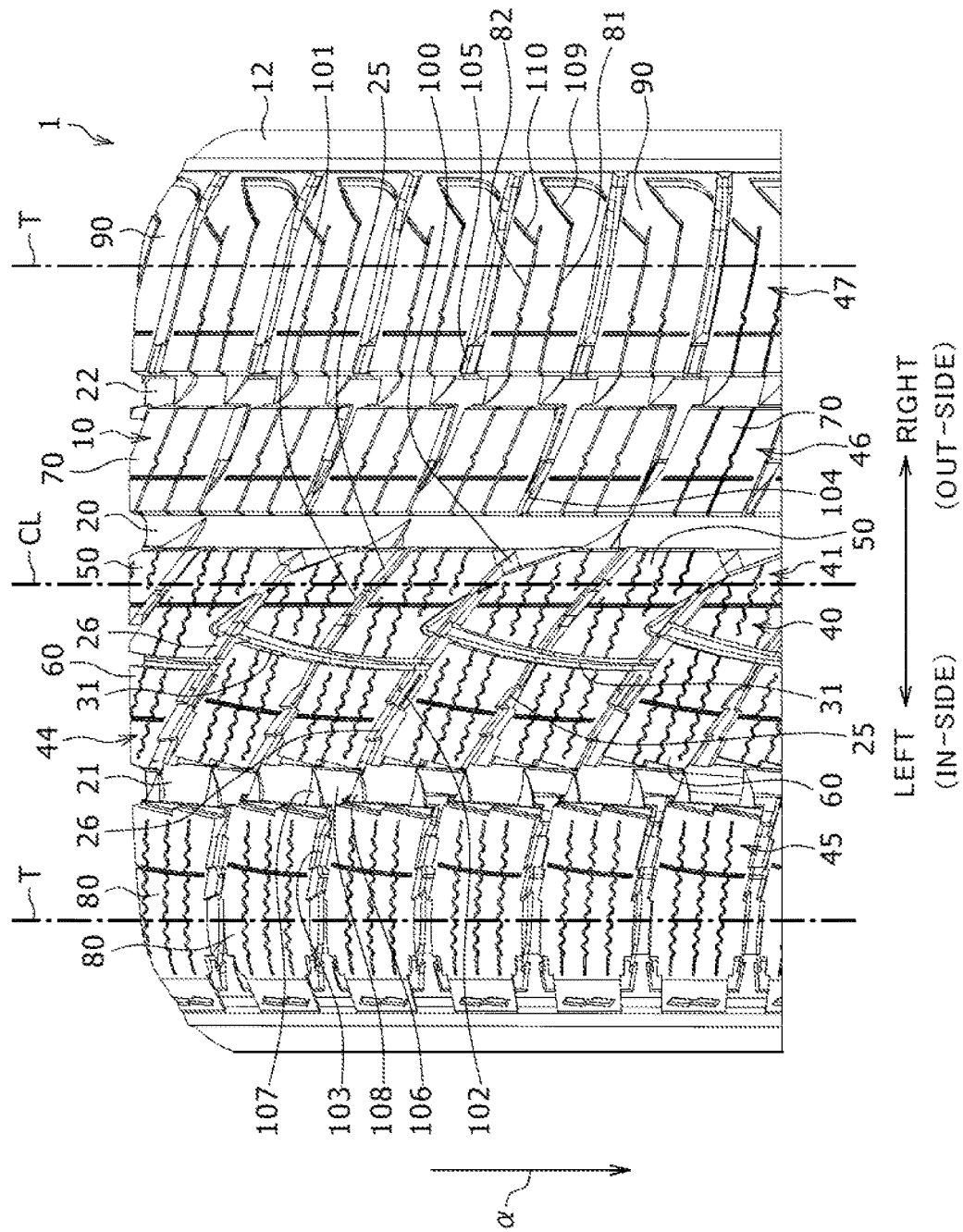
FIG. 2 is a plan view of a pneumatic tire according to an embodiment of the present disclosure, showing a part of a tread.

FIG. 1 is a perspective diagram of a pneumatic tire 1 according to an embodiment of the present disclosure. FIG. 2 is a plan view of the pneumatic tire 1, and shows a part of a tread. As shown in FIGS. 1 and 2, the pneumatic tire 1 has a tread 10 which is a portion which contacts the road surface. In the following, the "pneumatic tire 1" will also be called a "tire 1". The tread 10 has a tread pattern including a plurality of blocks, and is formed in an annular shape along a tire circumferential direction. While a "primary rotation direction" of the tire 1, which is a rotational direction of the tire 1 during forward travel of a vehicle on which the tire 1 is fitted, is not limited, in the following, primarily, a case will be described in which a direction of an arrow α of FIG. 1 is the primary rotation direction.

In the present disclosure, for the tire 1 and the constituent elements thereof, the terms "left" and "right" will be used for convenience of the description. A "right side" of the tire 1 refers to a right side when the tire 1 in a state of being fitted on the vehicle is viewed from the front side of the vehicle, and a "left side" refers to a left side when the tire 1 in the state of being fitted on the vehicle is viewed from the front side of the vehicle.

In the tire 1 according to an embodiment of the present disclosure, a direction of fitting of a front side and a back side of the tire 1 with respect to the vehicle is designated. That is, in the tire 1, a side which becomes an outer side in a vehicle width direction and a side which becomes an inner side in the vehicle width direction are respectively designated. In FIG. 1, the tire 1 is fitted to the vehicle so that the right side is at the outer side in the width direction of the vehicle (OUT-SIDE), and the left side is at the inner side in the width direction of the vehicle (IN-SIDE). Tires 1 of a common structure may be used for the left and right wheels by reversing the primary rotation direction and the left-and-right direction of the tire 1 between the tire 1 used for the right wheel of the vehicle and the tire 1 used for the left wheel.

The tread 10 has a plurality of circumferential grooves 20, 21, and 22, and a plurality of lug grooves 25 and 26 which extend while being curved from a left side, which is a first side, in the tire width direction to a right side, which is a second side, in the tire width direction. The tread 10 is partitioned by the plurality of circumferential grooves 20, 21, and 22, and a plurality of lug grooves 25, and 26, so as to include a plurality of blocks which are separated in the tire circumferential direction and also separated in the tire width direction.

The block is a land-like region bulged toward an outer side in a tire radial direction. As shown in FIG. 2, the tread 10 includes, as the blocks, a plurality of center blocks 50, a plurality of mediate blocks 60 and 70, and a plurality of shoulder blocks 80 and 90, all of which will be described below. A tire equator CL to be described below passes through the center block 50. The mediate block 60 and the shoulder block 80 are placed at a left side in a width direction of the tread 10, and the mediate block 70 and the shoulder block 90 are placed at a right side in the width direction of the tread 10.

The circumferential grooves 20, 21, and 22 include a first circumferential groove 20 formed near the center in the width direction of the tread 10, and a second circumferential groove 21 and a third circumferential groove 22 provided respectively on the left and right sides of the first circumferential groove 20. Further, a plurality of slanted circumferential grooves 31 which will be described later are formed between the first circumferential groove 20 and the second circumferential groove 21 of the tread 10. The "tire width direction" and the "width direction of the tread 10" are the same direction, and these terms will hereinafter be used appropriately.

The first circumferential groove 20 and the second circumferential groove 21 are provided either side of the center in the tire width direction. The first circumferential groove 20 is provided closest to the tire equator at the center in the tire width direction, among the circumferential grooves 20, 21, and 22. The tire equator CL refers to a line passing through the center in the tire width direction and extending along the tire circumferential direction.

Further, on the tread 10, a center region 40 is provided, which is a predetermined region in the tire width direction partitioned by the first circumferential groove 20 and the second circumferential groove 21. The center region 40 is divided into the center block 50 and the mediate block 60 which are separated to the right and left at each of a plurality of positions in the tire circumferential direction, by the plurality of slanted circumferential grooves 31 to be described later. The center block 50 is placed adjacent to the first circumferential groove 20 on the side near the center in the tire width direction. The center block 50 corresponds to a first land portion serving as a center land portion. A row of center blocks 41 is formed by the plurality of center blocks 50 arranged along the tire circumferential direction.

The mediate block 60 corresponds to a second land portion. A row of mediate blocks 44 is formed by the plurality of mediate blocks 60 arranged along the tire circumferential direction.

Further, a row of shoulder blocks 45, including a plurality of shoulder blocks 80 having an inner end in the tire width direction determined by the second circumferential groove 21, is formed on the tread 10. In addition, a row of mediate blocks 46, including a plurality of mediate blocks 70 partitioned by the first circumferential groove 20 and the third circumferential groove 22, is formed on the tread 10. Moreover, a row of shoulder blocks 47 including a plurality of shoulder blocks 90 having an inner end in the tire width direction determined by the third circumferential groove 22 is formed on the tread 10. The shoulder block 80 corresponds to a third land portion serving as a shoulder land portion. The mediate block 70 corresponds to a fourth land portion. The shoulder block 90 corresponds to a fifth land portion serving as a shoulder land portion. The circumferential grooves 20, 21, and 22 extend along the tire circumferential direction, and have approximately the same width as each other.

The plurality of lug grooves 25 and 26 extend while being curved from the left side in the tire width direction to the right side, and are placed with a spacing therebetween in the tire circumferential direction. The plurality of lug grooves 25 and 26 are inclined to the same side with respect to the tire width direction on each of the plurality of rows of blocks 41 and 44 to 47, and between blocks that are adjacent to each other in the tire circumferential direction. The lug grooves 25 and 26 in the row of center blocks 41 and the row of mediate blocks 44 are inclined more significantly with respect to the tire width direction than the lug grooves 25 and 26 in the other rows of blocks 45 to 47. With this configuration, it becomes easier to improve snow traction performance in a lateral direction at the center portion in the tire width direction. In addition, the plurality of lug grooves 25 and 26 have shallower depths than the plurality of circumferential grooves 20 to 22.

The plurality of lug grooves 25 and 26 include a plurality of first lug grooves 25 and a plurality of second lug grooves 26, distanced from each other in the tire circumferential direction. On the tread 10, one or more first lug grooves 25 and one or more second lug grooves 26 are alternately placed in the tire circumferential direction. In the following description, a case will be exemplified in which one first lug groove 25 and one second lug groove 26 are alternately placed along the tire circumferential direction on the tread 10. Alternatively, a configuration may be employed in which a plurality of first lug grooves 25 and one second lug groove 26 are alternately placed. The first lug groove 25 is a lug groove across which an intermediate portion of the slanted circumferential groove 31 to be described below extends in the tire circumferential direction in the center region 40. On the other hand, the second lug grooves 26 are lug grooves that are connected by respective ends of a slanted circumferential groove 31. The widths of the lug grooves 25 and 26 are basically approximately equal to each other, but ends of the lug grooves 25 and 26 near the first circumferential groove 20 in the row of mediate blocks 46 are narrower than those in the other portions.

In the present embodiment, blocks of the same type and assigned the same reference numeral are placed along the tire circumferential direction, arranged in one row. In addition, a plurality of blocks of the same number are arrange and placed, in a separated manner at a plurality of positions in the tire circumferential direction and along the plurality of lug grooves 25 and 26 of the tread 10. That is, on the tread 10, the same numbers of the center blocks 50, the mediate blocks 60 and 70, and the shoulder blocks 80 and 90 are formed.

On a ground-contacting surface of each block, a plurality of sipes of a narrow line shape are formed, which extend approximately along the tire width direction or approximately along the tire circumferential direction. Each sipe is a groove of a narrow line shape, having a narrower width than the circumferential grooves 20 to 22 and the lug grooves 25 and 26, and improves an edge effect to dig into snow and ice, to thereby realize superior braking and driving performance, and superior maneuver stability on the snow-ice road surface. The tire 1 having such a tread pattern is suited, for example, for an all-season tire.

The tire 1 has, on respective sides in the width direction of the tread 10, side walls 12 formed in an annular shape along the tire circumferential direction, similar to the tread 10.

On the other hand, the shoulder blocks 80 and 90 placed on respective ends in the width direction of the tread 10 include ground-contacting ends T (FIG. 2) which are ends of the ground-contacting surface on the outer side in the tire width direction. End portions of the shoulder blocks 80 and 90 in the tire width direction protrude from the ground-contacting ends T toward an outer side in the tire width direction, and are gradually curved toward the inner side in the tire radial direction such that outer circumferential surfaces are convex toward the outer side. The portion, of each of the shoulder blocks 80 and 90, protruding from the ground-contacting end T toward the outer side in the tire width direction is called a buttress.

In the present disclosure, the ground contacting ends T refer to respective ends, in the tire width direction, of a region contacting a flat road surface when a load which is 70% of a regular load (maximum load capability) at a regular internal pressure is applied in a state in which the tire 1 which is yet to be used is fitted on a regular rim, and filled with air to achieve the regular internal pressure.

Here, the "regular rim" refers to a rim determined by a tire standard, and is defined as a "standard rim" in JATMA, a "Design Rim" in TRA, and a "Measuring Rim" in ETRTO. The "regular internal pressure" is defined as a "maximum pneumatic pressure" in JATMA, a maximum value described in the table, "TIRE LOAD LIMITS AT VARIOUS COLD INFLATION PRESSURES" in TRA, and an "INFLATION PRESSURE" in ETRTO. The "regular load" is defined as a "maximum load capability" in JATMA, a maximum value described in the table, "TIRE LOAD LIMITS AT VARIOUS COLD INFLATION PRESSURES" in TRA, and a "LOAD CAPACITY" in ETRTO.

On an inner circumferential side of the tire 1, a reinforcement structure is provided, illustration of which is omitted. The reinforcement structure includes a carcass which is a cord layer covered with rubber, and a belt placed between the tread pattern and the carcass. The carcass is formed from, for example, two carcass plies, and forms a tire skeleton which endures load, shock, pneumatic pressure, and the like.

The belt is a reinforcement band stretched in the tire circumferential direction, and firmly fastens the carcass, to thereby improve rigidity of the tread 10. On an inner circumferential surface of the carcass, an inner liner which is a rubber layer for maintaining the pneumatic pressure is attached.

In addition, on the tire 1, a bead 13 is provided which is provided to be continuous from an inner circumferential end of the side wall 12, which extends to an inner side in the tire radial direction, the bead 13 being curved to be convex toward the inner side of the tire 1. The bead 13 is positioned at an inner side in the width direction of the tire 1 (side nearer to the tire equator CL) than the side wall 12. The bead 13 is a portion fixed on the rim of the wheel, and a bead core and a bead filler are provided in the bead 13.

Further, in the present embodiment, the slanted circumferential grooves 31 are formed at a plurality of positions of the center region 40 in the tire circumferential direction. With the slanted circumferential groove 31, the snow traction performance of the tire 1 can be improved. The slanted circumferential groove 31 will be described later in detail.

In addition, as shown in FIG. 2, in the row of center blocks 41, bridges 100 and 101 serving as raised portions are formed in the lug grooves 25 and 26 between the center blocks 50. With these bridges 100 and 101, the rigidity of the center blocks 50 that are adjacent in the tire circumferential direction can be improved. Similarly, raised portions 102, 103, 104, and 105 are provided respectively in the lug grooves 25 and 26 between the blocks in the row of mediate blocks 44, the row of shoulder blocks 45, the row of mediate blocks 46, and the row of shoulder blocks 47. With the raised portions 102 to 105, the rigidities of respective blocks adjacent in the tire circumferential direction can be improved.

At respective ends of the bridge 100 formed in the second lug groove 26 between the center blocks 50, inclined tapered surfaces are formed having heights which are reduced toward corresponding ends. With this configuration, as will be described below, reduction of water drainage performance at the center portion in the tire width direction can be suppressed while the rigidity of the center block 50 can be improved and dependence on the tire rotational direction can be suppressed.

In the second circumferential groove 21, raised portions 106 and 107 are formed as two first raised portions at groove bottoms at positions either side of ends of the lug grooves 25 and 26 near the second circumferential groove 21, between the shoulder blocks 80 of the row of shoulder blocks 45. In the second circumferential groove 21, at an intersection with extensions of the lug grooves 25 and 26, a raised portion 108 serving as a third raised portion is formed at the groove bottom in a portion surrounded in three directions by the two raised portions 106 and 107 and the raised portion 103 serving as a second raised portion. With this configuration, as will be described below, the snow traction performance can be improved and rolling resistance can be reduced, and in addition, an air pumping sound, which is tire noise, can be reduced.

Further, narrow grooves 109 and 110 to be described below which are inclined with respect to the tire circumferential direction are formed on portions of the shoulder block 90 at outer sides in the tire width direction than the ground-contacting ends T. With this configuration, the snow traction performance can be improved. In addition, the narrow grooves 109 and 110 are connected to sipes 81 and 82 serving as lateral sipes, and are not connected to the lug grooves 25 and 26, so that the water drainage performance can be improved and the rigidity of the shoulder block 90 can be improved.

Next, structures for the slanted circumferential groove 31, a portion of the second lug groove 26 near the first circumferential groove 20 and the first circumferential groove 20, connection portions between the second and third circumferential grooves 21 and 22 and the lug grooves 25 and 26, and the narrow grooves 109 and 110 of the shoulder block 90, will be described in detail. First, with reference to FIGS. 3 to 6, the slanted circumferential groove 31 will be described.

Figure 3:
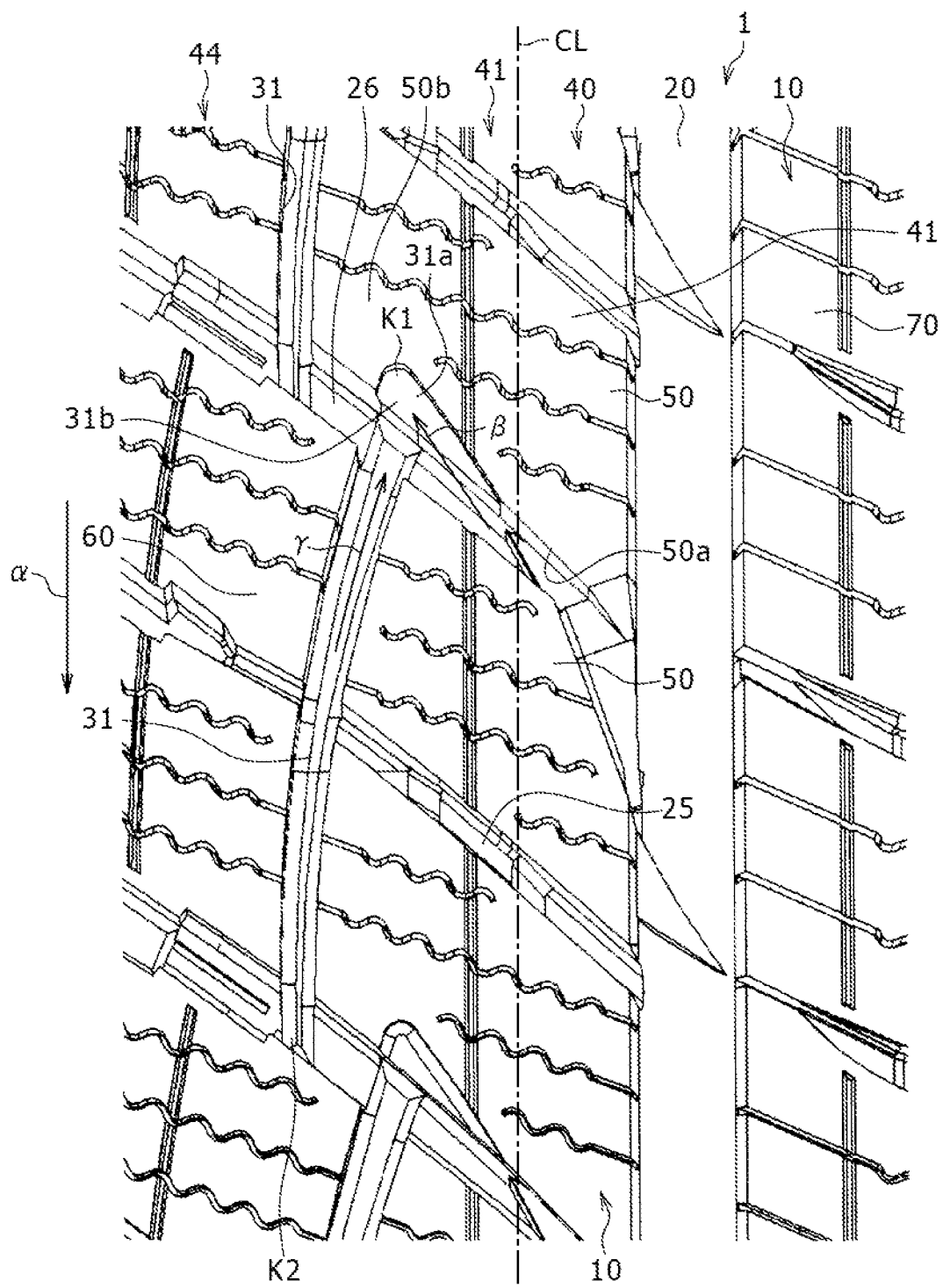
FIG. 3 is a plan view showing in an enlarged manner a part of a center region of a tread.
Figure 4:
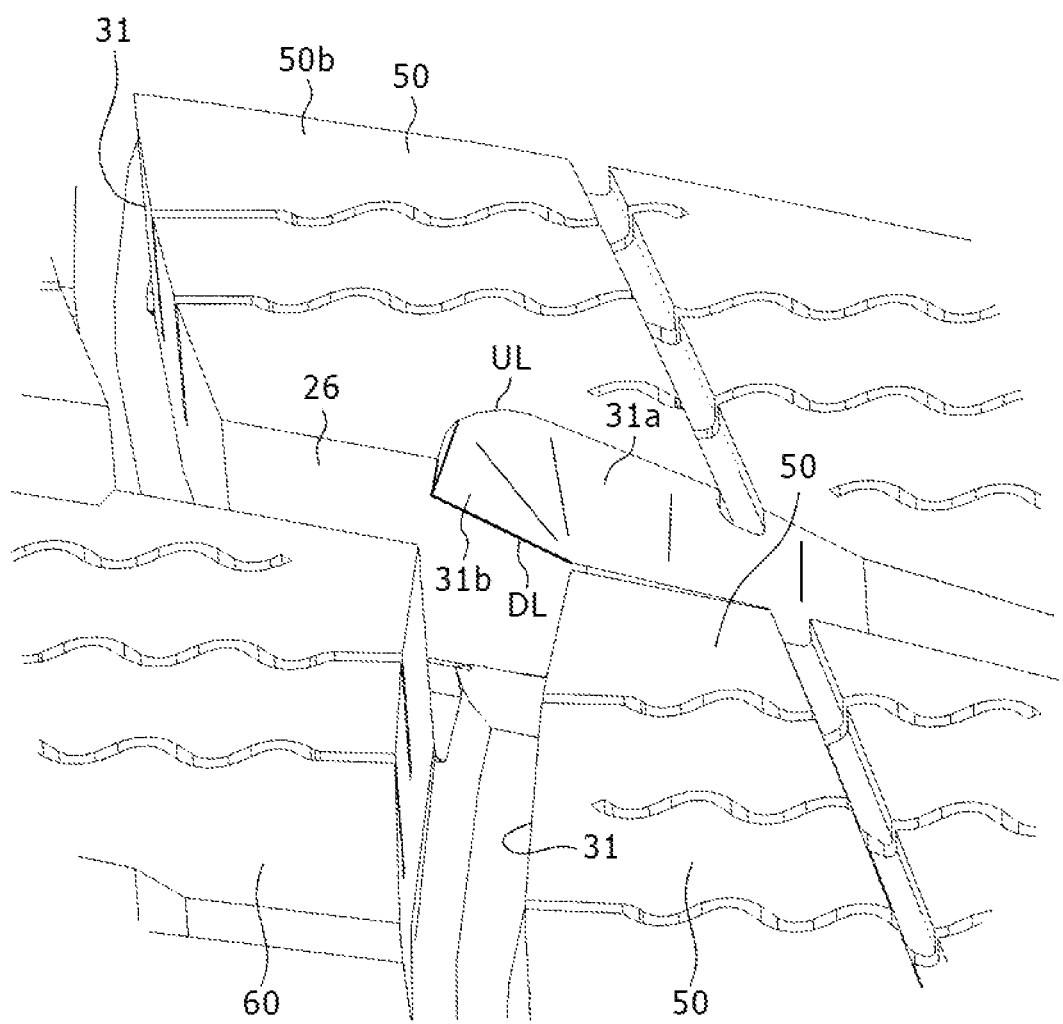
FIG. 4 is an enlarged perspective view of a recess on a slanted circumferential groove of FIG. 3.
Figure 5:
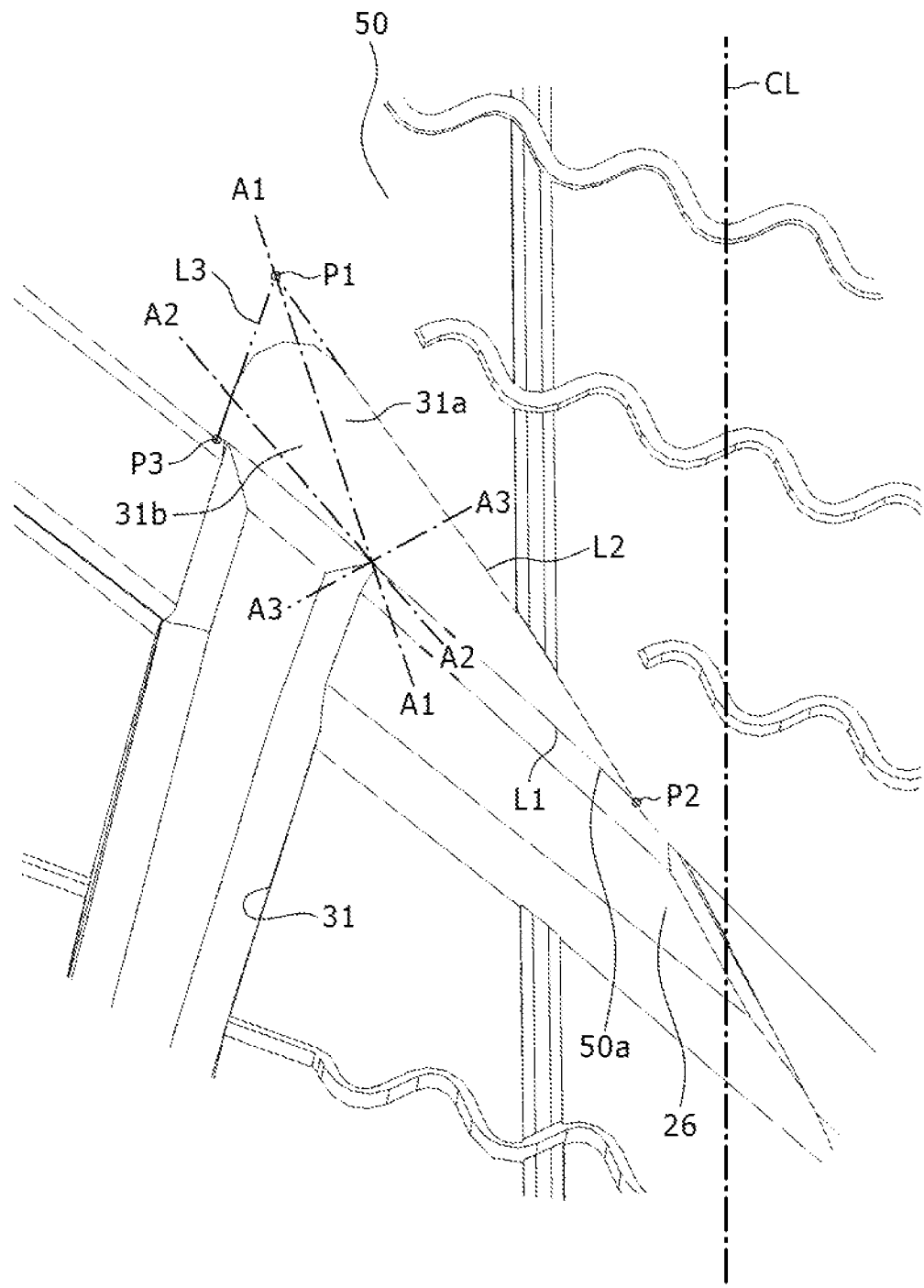
FIG. 5 is a plan view showing an enlarged manner the recess shown in FIG. 4.
Figure 6:
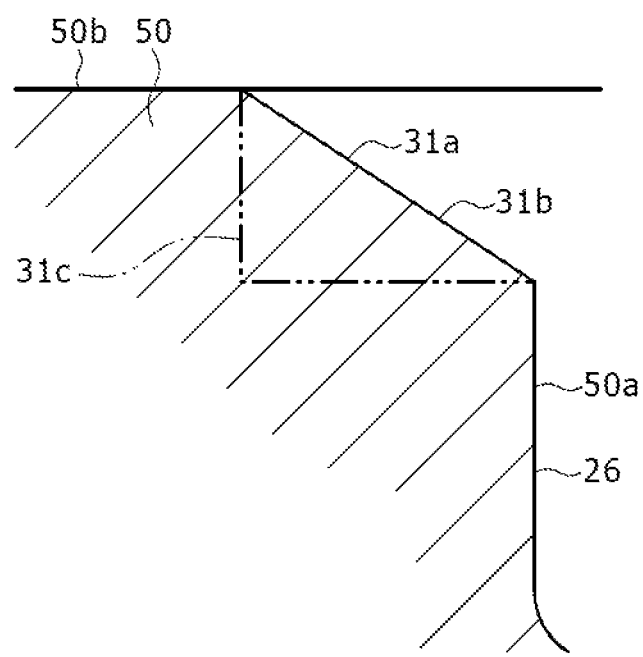
FIG. 6 is a diagram showing a cross section along a line A1-A1 in FIG. 5.

FIG. 3 is a plan view showing in an enlarged manner a part of the center region 40 of the tread 10. FIG. 4 is an enlarged perspective diagram of a recess 31a in the slanted circumferential groove 31 of FIG. 3. FIG. 5 is a plan view showing in an enlarged manner the recess 31a. FIG. 6 is a diagram showing across section along a line A1-A1 of FIG. 5.

The slanted circumferential groove 31 is provided at a plurality of positions in the tire circumferential direction on the center region 40. Each slanted circumferential groove 31 is a groove which extends across the first lug groove 25 in the tire circumferential direction, and is inclined with respect to the tire circumferential direction such that a first end K1 in a longitudinal direction is closer to the tire equator CL at the center in the tire width direction than a second end K2 in the longitudinal direction. The slanted circumferential groove 31 extends across the first lug groove 25, and connects two second lug grooves 26.

As a position where the first end K1 of the slanted circumferential groove 31 penetrates through the second lug groove 26, the recess 31a which extends into a wall surface 50a (FIG. 5) of the center block 50 is formed on the first end K1. The recess 31a extends along the second lug groove 26, and is a portion recessed from the ground-contacting surface of the center block 40 in a shape when viewed from the outer side in the tire radial direction, that is, in plan view, of an approximate isosceles triangle, as shown in FIG. 5.

More specifically, the shape of the recess 31a in plan view is an isosceles triangle with three vertices P1, P2, and P3, and a first long side L1, a second long side L2, and a short side L, with one corner corresponding to the vertex P1 rounded. Lengths of the first long side L1 and the second long side L2 are approximately equal to each other, and are longer than a length of the short side U. The first long side L1 extends along a longitudinal direction of the second lug groove 26. The vertex P1 of the isosceles triangle which is an intersection of the second long side L2 and the short side L3 goes inside the wall surface 50a. The vertices P1. P3 are positioned at a position farther away from the tire equator CL at the center in the tire width direction than the vertex P2 of the isosceles triangle which is an intersection of the first long side L1 and the second long side L2. The corner corresponding to the vertex P1 of the isosceles triangle is an intersection of the second long side L2 and the short side L3.

On a bottom surface of the recess 31a, an inclined surface 31b is formed which becomes closer to the ground-contacting surface 50a of the center block 50 toward an inner side of the center block 50. Specifically, as shown in FIG. 4, a region near a left end of a lower edge DL of a bottom surface of the recess 31a adjacent to the second lug groove 26 is inclined such that the region becomes closer to the ground-contacting surface toward a left end of the recess 31a. The left end of the recess 31a is slightly recessed toward an inner side of the center block 50, and the inclined surface 31b is formed connecting an upper edge UL and the lower edge DL on the ground-contacting surface 50b. With this configuration, as shown in the cross-sectional diagram of FIG. 6, the cross section of the bottom surface of the recess 31a is a straight line form inclined in a straight line shape which becomes closer to the ground-contacting surface 50b of the center block 50 toward the inner side of the center block 50 (left side of FIG. 6) on which the recess 31a is formed. Because of this, a relatively large space is formed at the inner side of the recess 31a extending into the wall surface 50a of the center block 50, into which water from the second lug groove 26 and the slanted circumferential groove 31 can enter. In the present disclosure, when the terms of "upper" and "lower" are used, with a side in which the heights in the bulging directions of the bulging portions such as the block, a protrusion, and the like are increased being referred to as the "upper" side, and a side in which the heights are reduced being referred to as the "lower" side".

Although not shown in the figures, in the cross section along a line A2-A2 and the cross section along a line A3-A3 in FIG. 5 also, similar to FIG. 6, the cross section of the bottom surface of the recess 31a is the straight line form inclined in the straight line shape which becomes closer to the ground-contacting surface 50b of the center block 50 toward the inner side of the center block 50.

As shown in FIG. 2, the plurality of slanted circumferential grooves 31 are connected over the entire circumference via a portion of the second lug grooves 26 formed at the plurality of positions in the tire circumferential direction, so that the slanted circumferential grooves 31 are formed in a zigzag shape. As shown in FIG. 4, portions of each of the slanted circumferential grooves 31 other than the recess 31a are deeper than portions of each of the lug groves 25 and 26 other than the intersection with the slanted circumferential groove 31. The depths of the portions of the slanted circumferential groove 31 other than the recess 31a may be approximately equal to the depth of each of the lug grooves 25 and 26.

With this configuration, the slanted circumferential groove 31 which is inclined with respect to the tire circumferential direction is formed, extending across the first lug groove 25 provided on the center region 40 of the tread 10. The recess 31a provided on the first end K1 of the slanted circumferential groove 31 extends into the center block 50, and the first end K1 is closer to the tire equator CL at the center in the tire width direction than the second end K2. Because of this, maneuver stability and turning performance of the vehicle on snow can be improved. For example, in portions of the slanted circumferential groove 31 other than the recess 31a, because the slanted circumferential groove 31 is inclined with respect to the tire circumferential direction, it becomes easier to dig into and grip snow and ice in the circumferential direction and the lateral direction of the tire. In addition, at the portion of the slanted circumferential groove 31 recessed at the left end of the recess 31a near the center in the tire width direction, it becomes easier to dig into and grip the snow and ice in the lateral direction of the tire 1. With this configuration, the snow traction performance in the circumferential direction and the lateral direction of the tire 1 can be improved. Moreover, because the first end K1 of the slanted circumferential groove 31 on which the recess 31a is provided is closer to the center in the tire width direction than the second end K2, the maneuver stability and the turning performance on snow can be improved to a higher degree than a configuration in which the recess is separated with a larger distance in the outer side in the tire width direction.

Further, the recess 31a provided on the first end K1 of the slanted circumferential groove 31 extends along the second lug groove 26. With this configuration, during traveling of the vehicle on the wet road surface, when the tire 1 rotates in such a manner that water flows from the side of the second end K2 to the side of the first end K1 in the slanted circumferential groove 31, the space between the recess 31a and the road surface can be widened, and it becomes possible to suppress a phenomenon in which the wall surface or the bottom surface of the recess 31a becomes a resistance to the flow of water. In addition, on the bottom surface of the recess 31a, the inclined surface 31b is formed which becomes closer to the ground-contacting surface 50b of the center block 50 toward the inner side of the center block 50. Thus, it becomes possible to suppress retention of water in the recess 31a. Further, unlike a structure in which a deeper side of a recess 31c is formed as a corner of a right angle as shown by a two-dots-and-chain line in FIG. 6, reduction of rigidity of the center block 50 can be suppressed. With such a configuration, superior water drainage performance from the groove of the tire 1 can be achieved, and thus, the tire 1 can be realized having an advantage of superior hydroplaning suppression, and which can suppress the reduction of rigidity of the center block 50.

For example, when the tire 1 rotates in a direction of an arrow α of FIG. 3 during the traveling of the vehicle, a case may be considered in which a water flow shown by an arrow β of FIG. 3, from the center in the tire width direction toward the outer side in the tire width direction along the second lug groove 26, merges with a water flow shown by an arrow γ of FIG. 3, toward a rear side in the rotational direction of the tire 1 along the slanted circumferential groove 31. In this case, a volume of a space can be widened at a merging portion by the recess 31a, and thus, resistance of the water flow can be suppressed and the water drainage performance can be improved.

Moreover, in the tire 1, the shape in plan view of the recess 31a is an isosceles triangle with a corner corresponding to the vertex P1 rounded. Thus, generation of a turbulent flow in the water flow at the deeper side of the recess 31a can be suppressed, the water flow in the groove in communication with the recess 31a can be smoothed, and the water drainage performance can be improved. Unlike the structure in which the shape of the recess 31a in plan view is set to a quadrangular shape, excessive enlargement of the recess 31a can be prevented while suppressing resistance to the water flow at the merging portion of the water flows, and therefore, the reduction of rigidity of the center block 50 can be suppressed.

Figure 7A:
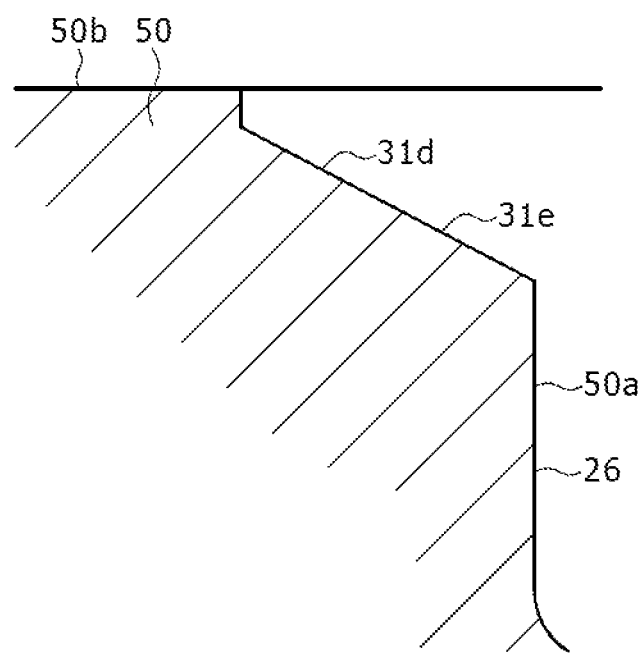
FIG. 7A is a diagram showing another configuration of the recess, and corresponding to FIG. 6.

FIG. 7A shows a first alternative configuration of the recess. In the structure shown in FIG. 7A, a position of an upper end of an inclined surface 31e formed on a bottom surface of a recess 31d is at a position going into the inner side in the tire radial direction (lower side in FIG. 7A) than the ground-contacting surface 50b. In this structure, in comparison to the structure shown in FIGS. 3 to 6, the rigidity of the center block 50 may be slightly reduced, but the space in the recess 31a can be widened. Thus, the advantage of suppression of hydroplaning can be further improved.

Figure 7B:
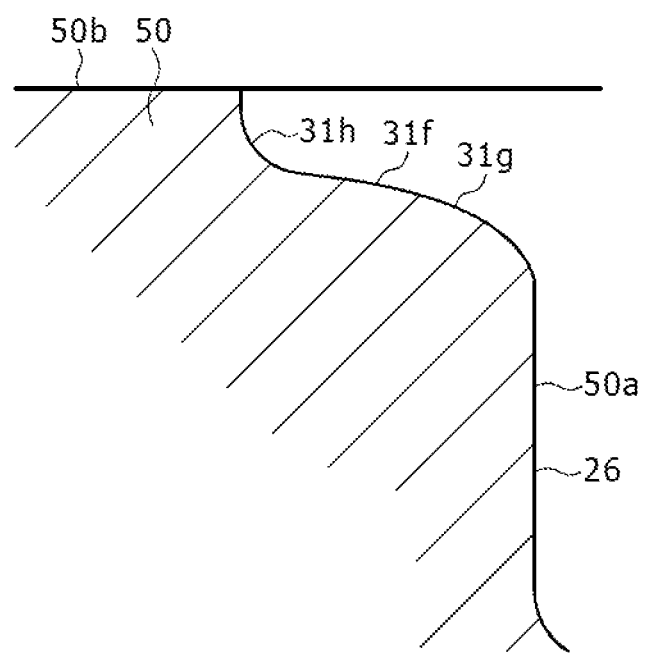
FIG. 7B is a diagram showing another configuration of the recess, and corresponding to FIG. 6.

FIG. 7B shows a second alternative configuration of the recess. In the structure shown in FIG. 7B, on a bottom surface of a recess 31f, there are formed a convex surface 31g having a cross section of a curved line and which is convex toward the outer side such that the surface becomes closer to the ground-contacting surface 50b of the center block 50 toward the inner side of the center block 50, and a concave surface 31h having a cross section of an arc shape in which a corner portion is continuously rounded from a deep end of the convex surface 31g. In this configuration also, in comparison to the structure shown in FIGS. 3 to 6, the rigidity of the center block 50 may be slightly reduced, but the space in the recess 31a can be widened. Therefore, the advantage of suppression of hydroplaning can be improved. Further, the water flow between the recess 31a and the groove can be smoothed, and the water drainage performance can be improved.

Figure 8:
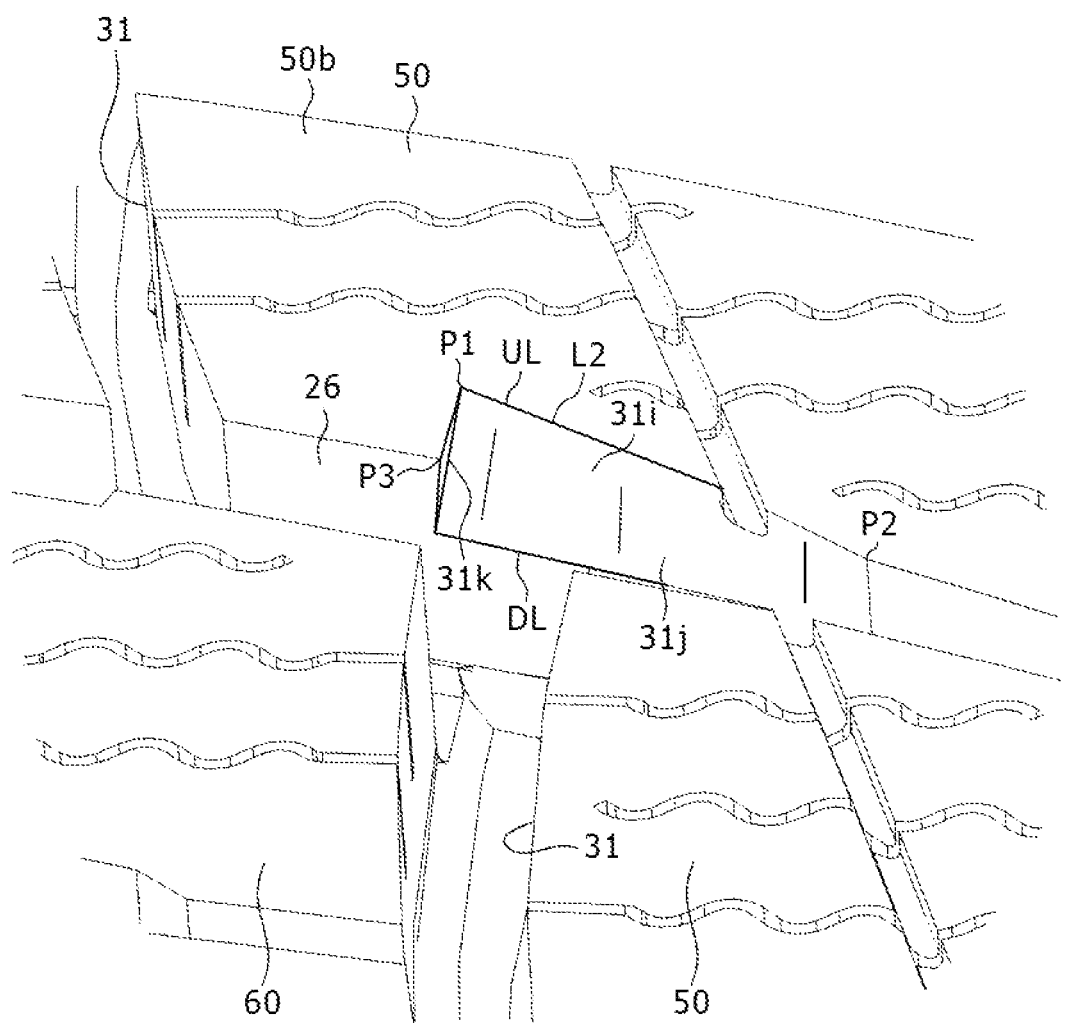
FIG. 8 is a diagram showing another configuration of the recess, and corresponding to FIG. 4.

FIG. 8 shows a third alternative configuration of the recess. In the structure shown in FIG. 8, unlike the structure shown in FIGS. 3 to 6, a shape of a recess 31i in plan view is an isosceles triangle without the corners rounded. An inclined surface 31j is formed at a bottom surface of the recess 31a, which has the second long side L2 connecting the vertex P1 and the vertex P2 as an upper edge UL, and which connects the upper edge UL and a lower edge DL at the side of the bottom surface of the groove. In the case of this structure, because the area of a wall surface 31k at a left end of the recess 31i can be widened, the snow traction performance in the lateral direction can be further improved.

Figure 9:
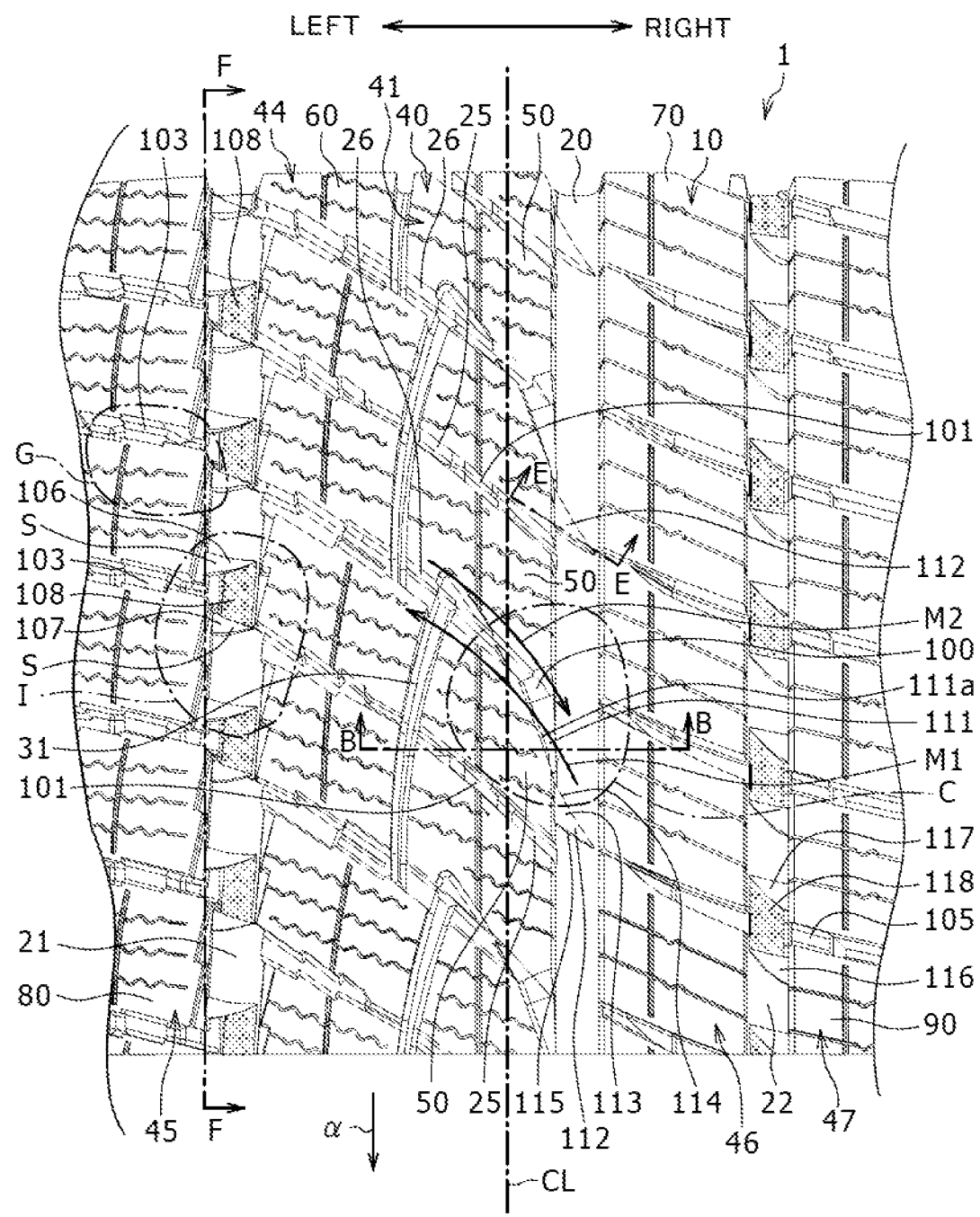
FIG. 9 is a plan view showing in an enlarged manner a part of a center region of a tread in an embodiment of the present disclosure.
Figure 10:
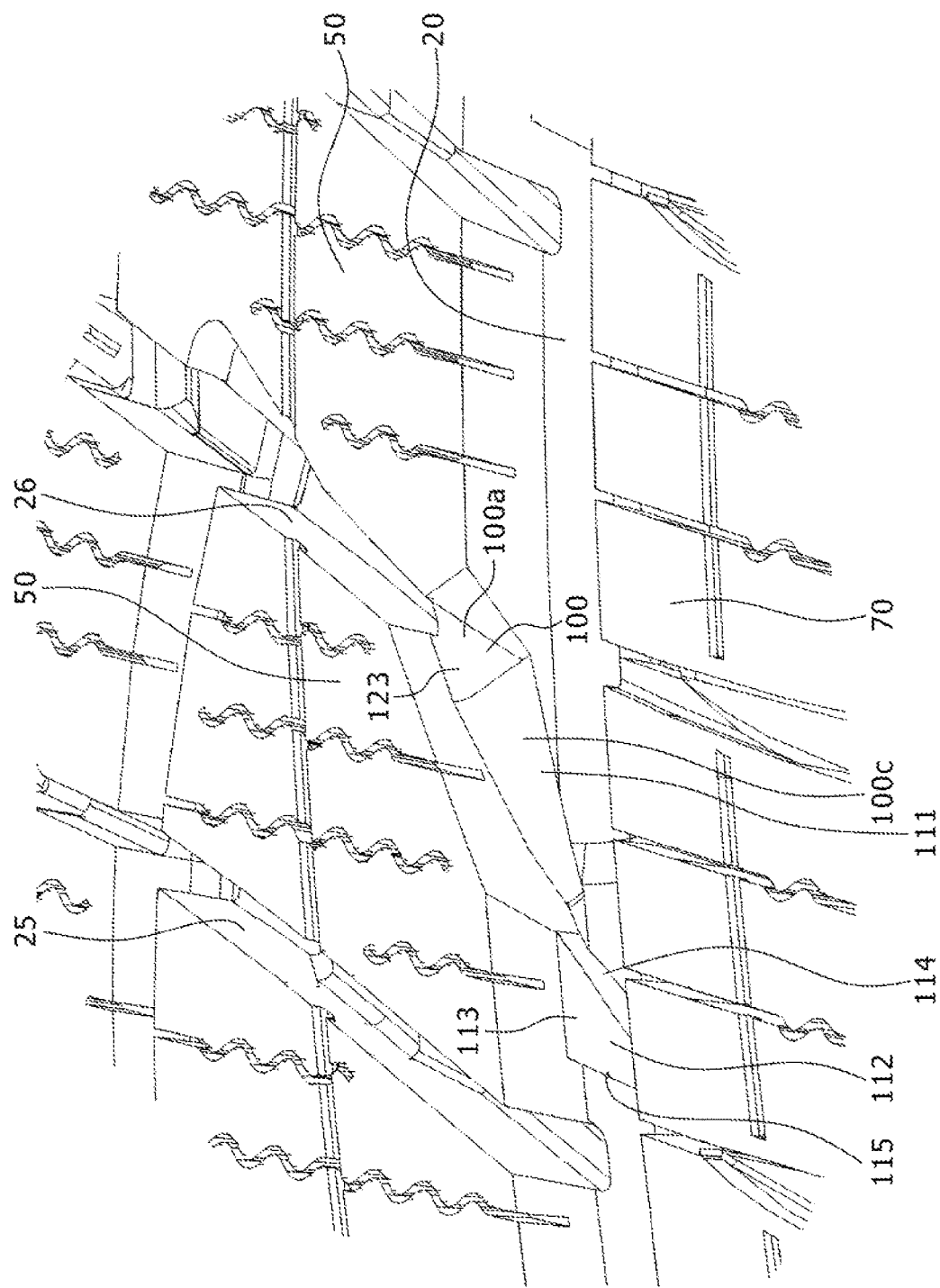
FIG. 10 is a perspective diagram showing in an enlarged manner a connection portion between a first circumferential groove and a lug groove between center blocks which are first land portions of FIG. 9.
Figure 11:
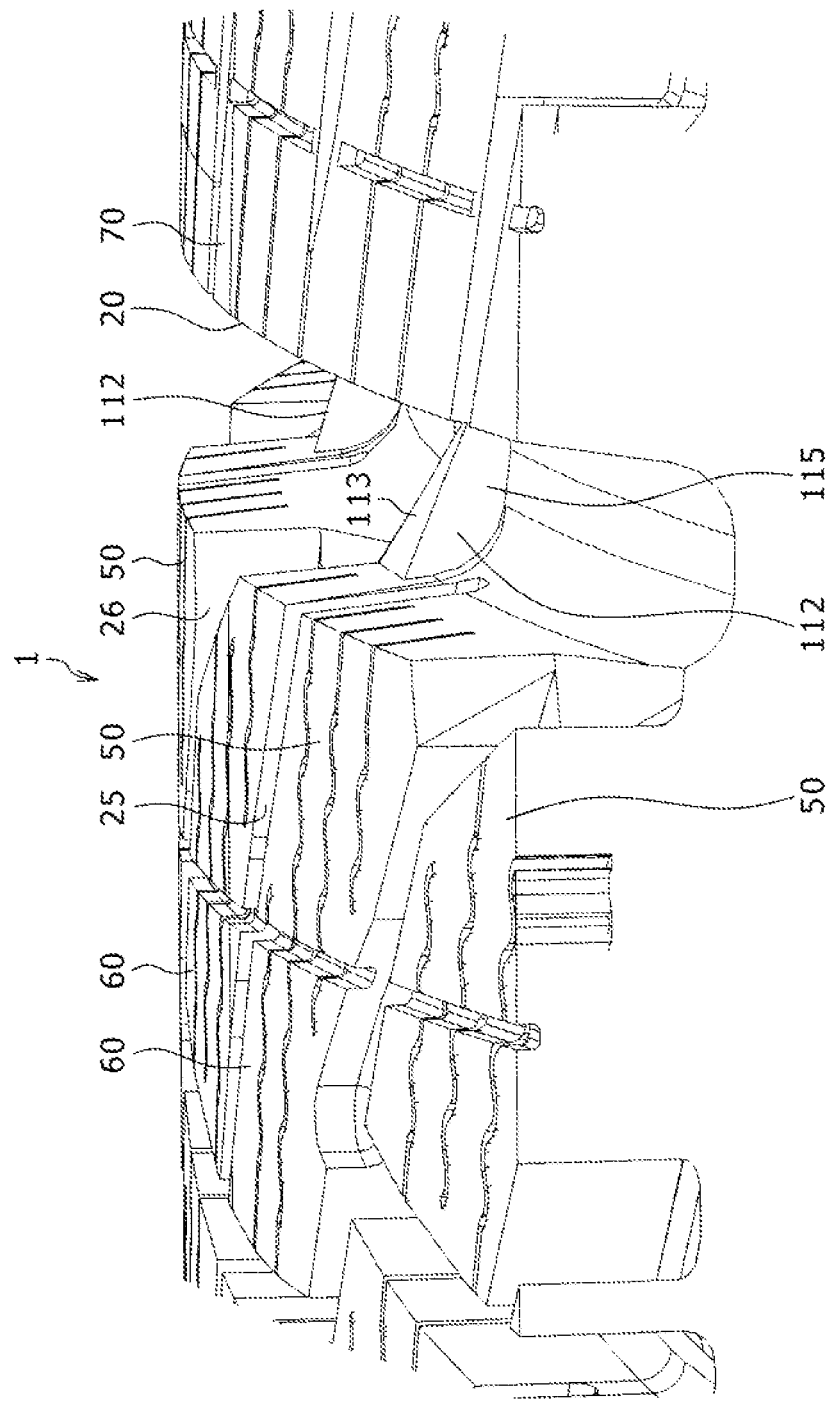
FIG. 11 is an enlarged perspective diagram cutting FIG. 9 along a line B-B.
Figure 12:
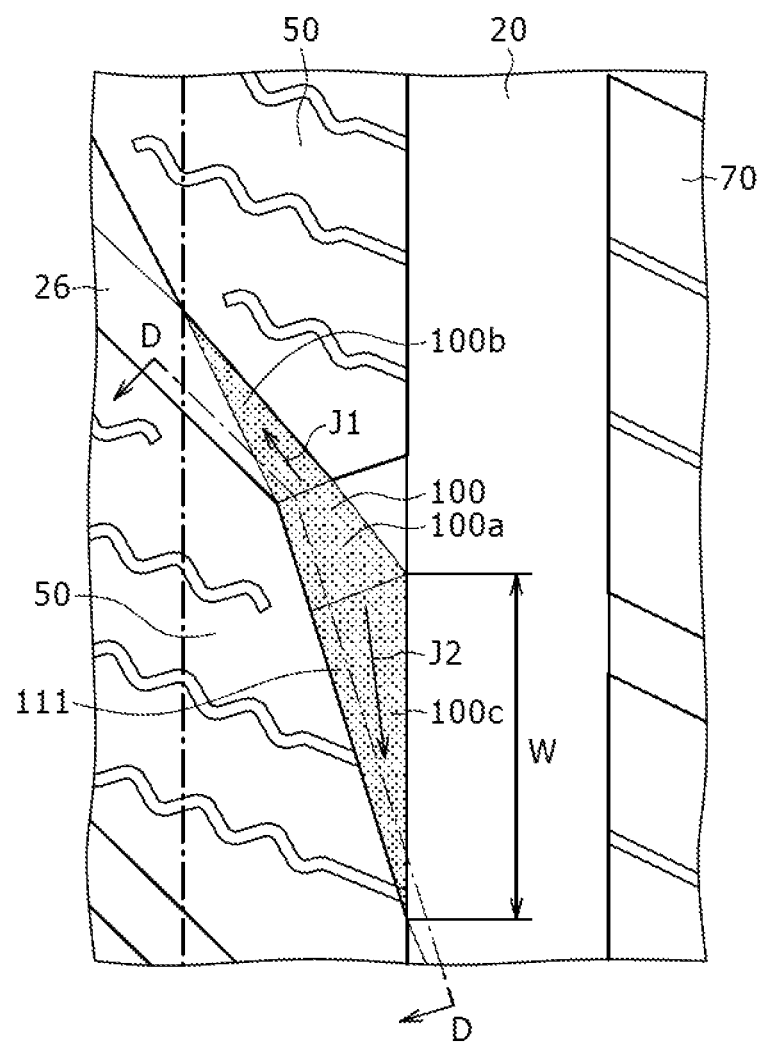
FIG. 12 is a plan view showing in an enlarged manner a C part of FIG. 9.
Figure 13:
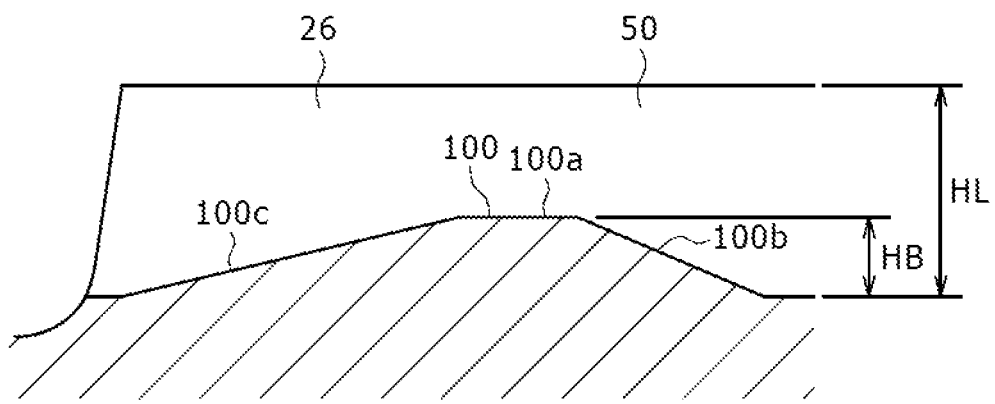
FIG. 13 is a diagram showing a cross section along a line D-D of FIG. 12.
Figure 14:
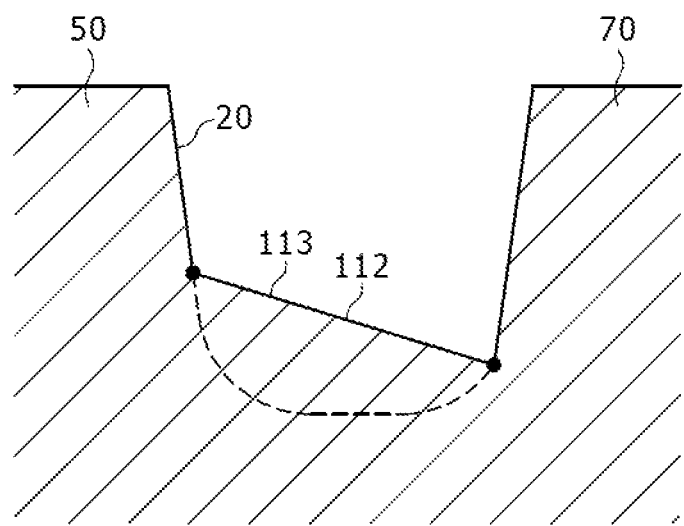
FIG. 14 is an enlarged view of a cross section along a line E-E of FIG. 9.

Next, structures of a portion of the second lug groove 26 near the first circumferential groove 20, and the first circumferential groove 20 will be described in detail with reference to FIGS. 9 to 14. FIG. 9 is a plan view showing in an enlarged manner apart of the center region 40 of the tread 10. FIG. 10 is a perspective view showing in an enlarged manner a connection portion between the first circumferential groove 20 and the second lug groove 26 between the center blocks 50 shown in FIG. 9. FIG. 11 is an enlarged perspective diagram showing FIG. 9, which is cut along a line B-B. FIG. 12 is a plan view showing in an enlarged manner a C part of FIG. 9. FIG. 13 is a diagram showing a cross section along a line D-D of FIG. 12. FIG. 14 is an enlarged view of a cross section along a line E-E of FIG. 9.

As shown in FIGS. 9 to 14, a plurality of the center blocks 50 are placed adjacent to the first circumferential groove 20 at a side near the center in the tire width direction. The lug grooves 25 and 26 between the center blocks 50 extend to a right side in the tire width direction and open to the side near the first circumferential groove 20. On the portion of the second lug groove 26 between the center blocks 50, near the first circumferential groove 20, the bridge 100 having a bottom surface which is bulged is formed. FIG. 12 shows the bridge 100 with a portion shaded with fine dots.

The bridge 100 is provided in order to improve the rigidity of adjacent center blocks 50. As shown in FIGS. 12 and 13, the bridge has a cross-sectional shape of an approximate trapezoid. Specifically, the bridge has an upper surface 100a which is approximately planar along the tire circumferential direction, and has tapered surfaces 100b and 100c in which side surfaces on an end of the second lug groove 26 near the center in the longitudinal direction and an end of the second lug groove 26 near the first circumferential groove 20 are inclined so that heights thereof are reduced toward the corresponding ends of the bridge 100 in the longitudinal direction. In FIG. 12, each of arrows J1 and J2 shown on side surfaces on both sides of the bridge 100 show that a corresponding side surface is inclined in a direction of reducing the height, from an upper surface toward a tip of the arrow.

In the second lug groove 26, a wide-width portion 111 which is a space of an approximate triangular shape in plan view is formed, on the end near the first circumferential groove 20, in a range W in the tire circumferential direction of FIG. 12, in which the width in the tire circumferential direction is larger on the side near the first circumferential groove 20 than the side near the center of the lug groove. The tapered surface 100c of the bridge 100 on the side near the first circumferential groove 20 is provided in this wide-width portion 111.

As shown in FIG. 10, an end of the bridge 100 in the width direction is connected to a wall surface of the center block 50 via an R portion 123 having a cross section of an arc shape. Alternatively, a configuration may be employed in which the end in the width direction of the bridge 100 is directly connected to the wall surface, without the intervention of the R portion. As shown in FIG. 13, a maximum height HB of the bridge HB may be set, for example, in a range of greater than or equal to 30% and less than or equal to 40% of a depth HL of the second lug groove 26.

Although not described in detail, as shown in FIG. 9, the bridge 101 having the bottom surface which is bulged is formed at an intermediate portion of the first lug groove 25 between the center blocks 50, which is adjacent to the second lug groove 26. Similar to the bridge 100, the bridge 101 has a cross-sectional shape of a trapezoid, with tapered surfaces in which side surfaces on respective ends are inclined so that the heights are reduced toward the corresponding ends of the bridge 101 in the longitudinal direction.

As shown in FIGS. 9 to 11 and 14, on the bottom surface of the first circumferential groove 20, a tapered protrusion 112 is formed adjacent to the wide-width portion 111 at a first side in the tire circumferential direction (lower side of FIG. 9 and left side of FIG. 10). The tapered protrusion 112 has an approximate triangular shape in plan view, and is formed to bulge toward the outer side in the tire radial direction. In addition, as shown in FIGS. 11 and 14, on an upper surface of the tapered protrusion 112, a first inclined surface 113 is provided in which a left side, which is a side near the lug grooves 25 and 26 between the center blocks, is higher than a right side, which is a side near the mediate block 70.

Moreover, as shown in FIGS. 9 and 10, a second inclined surface 114 which is inclined toward a second side in the tire circumferential direction (upper side of FIG. 9 and right side of FIG. 10) toward the wide-width portion 111 with respect to the tire width direction is formed over the entirety of a side surface of the tapered protrusion 112 on the second side in the tire circumferential direction. As shown in FIG. 9, the second inclined surface 114 extends approximately along a wall surface 111a of the wide-width portion 111 on the side near the tapered protrusion 112.

Further, in the tapered protrusion 112, a third inclined surface 115 which is inclined in the second side in the tire circumferential direction toward the center block 50 with respect to the tire width direction is formed over the entirety of a side surface on the first side in the tire circumferential direction (lower side of FIG. 9 and left side of FIG. 10). The third inclined surface 115 is placed nearer to the second side in the tire circumferential direction than an opening of the first lug groove 25 on the side near the first circumferential groove 20. The third inclined surface 115 is inclined with respect to the tire circumferential direction so as to extend approximately along the longitudinal direction of the first lug groove 25.

According to the above-described structure, because bridges 100 and 101 are provided in the lug grooves 25 and 26 between the center blocks 50, the rigidity of the center block 50 can be improved. In addition, during travel of the vehicle on the wet road surface, even when the tire rotates in a direction such that water flows from the first circumferential groove 20 near the center in the tire width direction toward the lug grooves 25 and 26 between the center blocks 50, the water can be easily caused to flow from the first circumferential groove 20 to the lug grooves 25 and 26, by the tapered surface 100c of each of the bridges 100 and 101.

More specifically, when the tire 1 rotates in the direction of the arrow α in FIG. 9, the water tends to be easily caused to flow from the first circumferential groove 20 to the second lug groove 26 along the direction shown by an arrow M1 in FIG. 9, due to the tapered surface 100c (FIG. 12) of the bridge 100. On the other hand, when the tire 1 rotates in a direction opposite to the direction of the arrow α in FIG. 9, the water tends to be easily caused to flow from the second lug groove 26 to the first circumferential groove 20, that is, in a direction shown by an arrow M2 in FIG. 9, due to the tapered surface 100b (FIG. 12) of the bridge 100. With this configuration, the tire 1 can be realized in which reduction in the water drainage performance at the center portion in the tire width direction is suppressed while the rigidity of the center block 50 is improved and the dependence on the tire rotational direction are suppressed.

In addition, the tapered protrusion 112 having, as the upper surface, the first inclined surface 113 which is higher on the side near the lug grooves 25 and 26 between the center blocks 50, is formed on the bottom surface of the first circumferential groove 20. Thus, when the tire 1 rotates in the direction of the arrow α in FIG. 9, the water tends to be more easily caused to flow along the first inclined surface 113, from the first circumferential groove 20 to the second lug groove 26 between the center blocks 50. With this configuration, the reduction of the water drainage performance at the center portion in the tire width direction can be further suppressed.

Moreover, the wide-width portion 111 is formed on the end of the second lug groove 26 near the first circumferential groove 20, the tapered protrusion 112 is placed adjacent to the first side of the wide-width portion 111 in the tire circumferential direction, and the second inclined surface 114 is formed on the side surface of the tapered protrusion 112 on the second side in the tire circumferential direction. With this configuration, when the tire rotates in a direction opposite to the direction of the arrow α in FIG. 9, because of the inclination of the first inclined surface 113 of the tapered protrusion 112 and the inclination of the second inclined surface 114, even with the presence of the tapered protrusion 112, the water flowing from the second lug groove 26 into the first circumferential groove 20 can flow through the right side of the first circumferential groove 20 in the tire width direction to the first circumferential groove 20 in a larger amount, and can be drained.

Further, the third inclined surface 115 is formed on the side surface of the tapered protrusion 112 on the first side in the tire circumferential direction. The third inclined surface 115 is inclined with respect to the tire circumferential direction, so as to extend along the longitudinal direction of the first lug groove 25. With this configuration, when the tire 1 rotates in the direction of the arrow α in FIG. 9, due to the third inclined surface 115 of the tapered protrusion 112, the water can be easily caused to flow from the first circumferential groove 20 to the first lug groove 25. Because of this, the reduction of the water drainage performance at the center portion in the tire width direction can be further suppressed.

In the case of the present embodiment, because of the bridge 101 having the trapezoidal cross section, provided at the intermediate portion of the first lug groove 25 between the center blocks 50, the rigidity of the center blocks 50 at both sides in the tire circumferential direction can be improved. Further, similar to the bridge 100, the water drainage performance from the first circumferential groove 20 to the first lug groove 25 can be improved.

Figure 15:
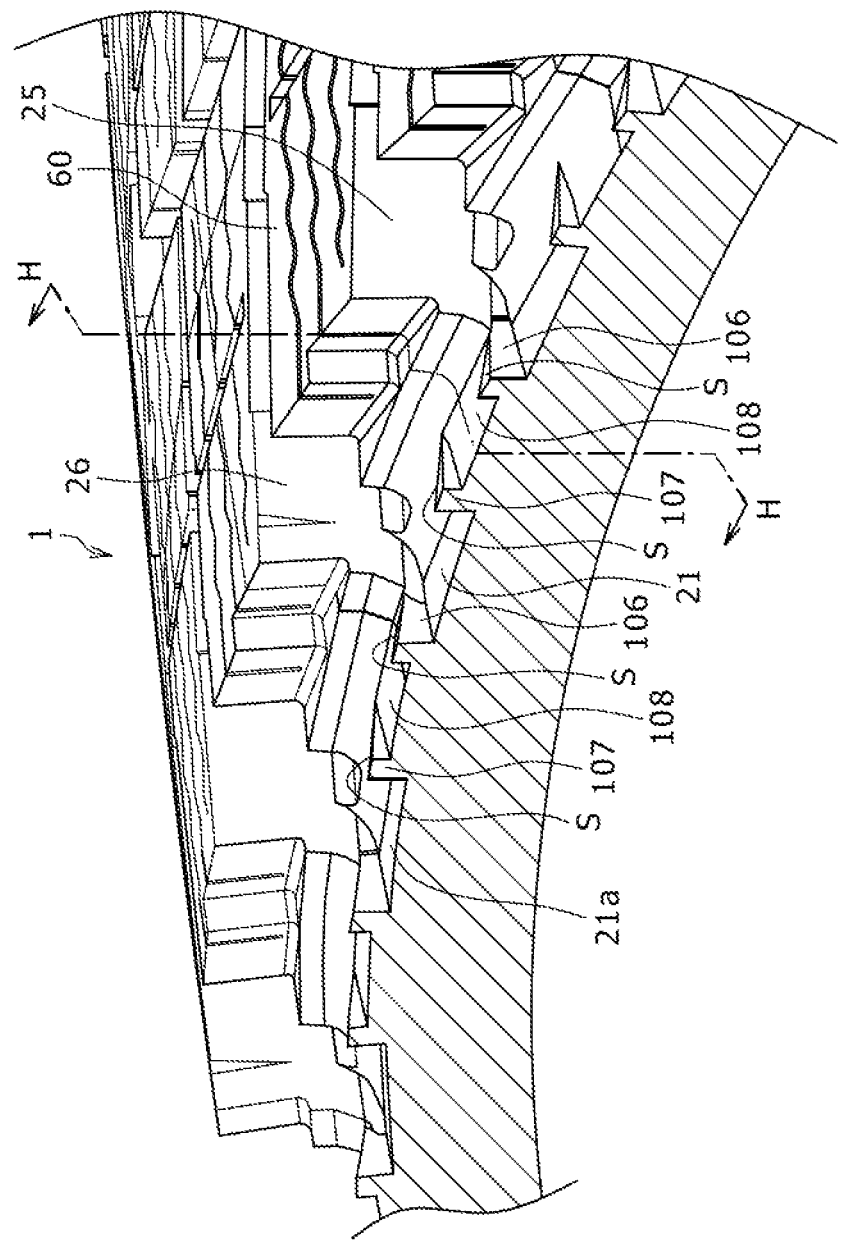
FIG. 15 is an enlarged perspective diagram of an embodiment of the present disclosure, cutting FIG. 9 along a line F-F.
Figure 16:
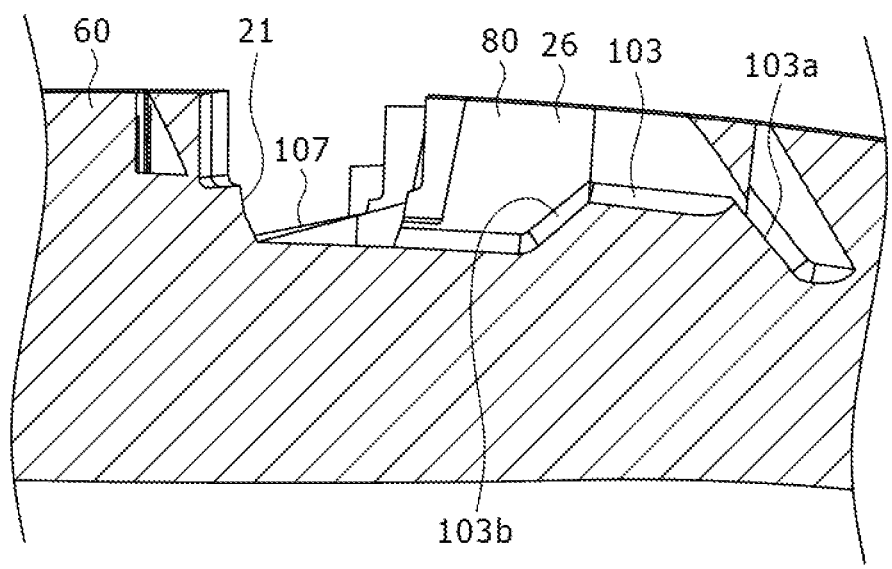
FIG. 16 is an enlarged cross-sectional view showing a bridge which corresponds to a second raised portion in a G part of FIG. 9.
Figure 17:
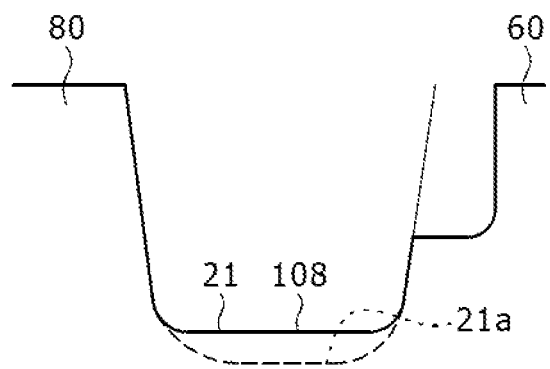
FIG. 17 is an enlarged view of a cross section along a line H-H of FIG. 15.

Next, the structure of the connection portion between each of the second and third circumferential grooves 21 and 22 and the lug groove will be described in detail. FIG. 15 is an enlarged perspective diagram showing an embodiment of the present disclosure, cutting FIG. 9 along a line F-F. FIG. 16 is an enlarged cross-sectional diagram showing the raised portion 103 which is the second raised portion at a G part in FIG. 9. FIG. 17 is an enlarged view of a cross section along a line H-H of FIG. 15.

With reference to FIGS. 9 and 15 described above, in the second circumferential groove 21, the raised portions 106 and 107 serving as the two first raised portions are formed respectively corresponding to the lug grooves 25 and 26, on the groove bottom at positions either side of the ends of the lug grooves 25 and 26 near the second circumferential groove 21. Each of the raised portions 106 and 107 is formed to bulge to an outer side in the tire radial direction. As shown in FIG. 9, a shape of the raised portions 106 and 107 in plan view is an approximate triangle with a bottom side connected to a wall surface of the shoulder block 80 and a vertex connected to a wall surface on the side near the mediate block 60.

Further, as shown in FIGS. 15 and 16, upper surfaces of the raised portions 106 and 107 are inclined surfaces S which are inclined such that heights thereof are increased in the outer side in the tire radial direction toward the shoulder block 80. With this configuration, during travel of the vehicle on the wet road surface, when the tire 1 rotates in the direction of the arrow α in FIG. 9 or in a direction opposite to the direction of the arrow α, due to the inclined surfaces S of the raised portions 106 and 107, water tends to be easily caused to flow from the second circumferential groove 21 to the lug grooves 25 and 26 between the shoulder blocks 80. Thus, as will be described below, even when the raised portion 103 serving as the second raised portion is provided in the lug grooves 25 and 26, the water drainage performance can be improved.

More specifically, as shown in FIGS. 9 and 16, the raised portion 103 which is bulged to the outer side in the tire radial direction is formed on the groove bottom of the portions, of the lug grooves 25 and 26 between the shoulder blocks 80, near the second circumferential groove 21. Similar to the bridges 100 and 101 provided on the lug grooves 25 and 26 between the center blocks 50, the raised portion 103 has a cross-sectional shape of an approximate trapezoid. Specifically, the raised portion 103 has an upper surface which is approximately planar along the tire circumferential direction, and two tapered surfaces 103a and 103b in which side surfaces on respective sides in the longitudinal direction of the lug grooves 25 and 26 are inclined such that the heights thereof are reduced toward corresponding ends of the raised portion 103. The raised portion 103 is provided for improving the rigidity of the shoulder block 80, and respective ends in the width direction are connected to the wall surfaces of the shoulder blocks 80 that are adjacent in the tire circumferential direction.

As described above, the inclined surface S is formed on the upper surface of each of the raised portions 106 and 107 in the second circumferential groove 21. With this configuration, when the vehicle travels on the wet road surface, even with the presence of the bridge 100, the water can be easily caused to flow from the second circumferential groove 21 to the lug grooves 25 and 26 so that the water drainage performance can be improved.

On the other hand, in such a configuration in which the two raised portions 106 and 107 are formed in the second circumferential groove 21 and the raised portion 103 is provided in the lug grooves 25 and 26, when the space of intersections with extensions of the lug grooves 25 and 26 in the second circumferential groove 21 is relatively wide, air tends to accumulate in this space. With this configuration, during travel on the dry road surface by the vehicle on which the tire 1 is fitted, an air pumping sound tends to be generated due to the air accumulated in the space of the intersection.

In the present embodiment, in order to resolve such a disadvantage, as shown in FIGS. 9, 15, and 17, in the second circumferential groove 21, at the intersections with the extensions of the lug grooves 25 and 26, the raised portion 108 serving as the third raised portion is formed on the groove bottom of a portion surrounded in three directions by the two raised portions 106 and 107 and the raised portion 103. The raised portion 108 bulges to the outer side in the radial direction, to have a height higher than a reference surface 21a, which is the lowest portion of the second circumferential groove 21 (FIGS. 15 and 17).

In FIG. 9, the raised portion 108 is shown as a portion shaded with fine dots in the second circumferential groove 21. As shown in FIG. 9, the raised portion 108 has an approximate trapezoidal shape in plan view, and respective end edges in the tire circumferential direction are connected to wall surfaces of the ends, of the two raised portions 106 and 107 on both sides, in the tire circumferential direction.

As shown in FIG. 17, an upper surface of the raised portion 108 is approximately planar, with the height in the up-and-down direction from the reference surface 21a being constant. Respective end edges of the raised portion 108 in the tire width direction are connected to wall surfaces of the second circumferential groove 21. As shown in FIG. 15, the upper surface of the raised portion 108 has a height lower than those of the upper surfaces of the raised portions 106 and 107. In the present embodiment, the lowest ends of the inclined surfaces S of the raised portions 106 and 107 have a height position approximately equal to that of the upper surface of the raised portion 108.

As shown in FIG. 9, the ends of the lug grooves 25 and 26 between the shoulder blocks 80, near the second circumferential groove 21, oppose the wall surface of the ends in the tire width direction of the mediate block 60 via a portion, in the second circumferential groove 21 on lines of extension of the lug grooves 25 and 26, in which the raised portion 108 is provided on the groove bottom.

According to the configuration described above, in the second circumferential groove 21, the two raised portions 106 and 107 are formed on the groove bottom at positions either side of the ends, of the lug grooves 25 and 26, near the second circumferential groove 21. Further, the raised portion 103 is formed on the groove bottom of the portions, of the lug grooves 25 and 26, near the second circumferential groove 21. With this configuration, the rigidities of the shoulder blocks 80 adjacent to the raised portions 106 and 107 of the second circumferential groove 21 and of the shoulder blocks 80 adjacent to the raised portions 103 of the lug grooves 25 and 26 can be improved. Because of this, the rigidity of the shoulder block 80 is improved by one of the raised portions 106 and 107 and the raised portion 103. Therefore, energy loss caused by deformation of the block during the travel of the vehicle can be reduced, and rolling resistance of the tire 1 can be reduced. Further, during travel on the snowy road surface, the resistance between the tire 1 and the road surface can be increased by a shearing force acting on the snow that has been pressurized and hardened in the groove, and the snow traction performance can thus be improved.

Moreover, in the second circumferential groove 21, at the intersections with the extensions of the lug grooves 25 and 26 between the shoulder blocks 80, the raised portion 108 is formed on the groove bottom in the portion surrounded in three directions by the two raised portions 106 and 107 and the raised portion 103. With this configuration, the volume of the space at the intersection can be reduced, and the amount of air accumulation can be reduced. Thus, the air pumping sound during travel can be reduced.

Further, the ends of the lug grooves 25 and 26 between the shoulder blocks 80, near the second circumferential groove 21, oppose the wall surface of the mediate block 60 via the portion, in the second circumferential groove 21 on the lines of extension of the lug grooves 25 and 26, on which the raised portion 108 is provided on the groove bottom. With this configuration, the intersection of the second circumferential groove 21 described above is surrounded in four directions by the three raised portions 106, 107, and 108, and the wall surface of the mediate block 60. Because of this, the air tends to not be easily discharged from the intersection during travel of the vehicle, but the amount of air accumulation can be reduced by the raised portion 108. Thus, the advantage of providing the raised portion 108 can be made more significant.

In the present embodiment, as shown in FIG. 9, in the third circumferential groove 22, two raised portions 116 and 117 having an approximate triangular shape in plan view are also formed on the groove bottom at positions either side of ends, of the lug grooves 25 and 26 between the shoulder blocks 90, near the third circumferential groove 22. In addition, the raised portion 105 is formed on the groove bottom on the side, of the lug grooves 25 and 26 between the shoulder blocks 90, near the third circumferential groove 22. In the raised portion 105, a tapered surface having a height which is lowered toward an end is formed only on a side surface at ends, of the lug grooves 25 and 26, near the center in the longitudinal direction. An end near the third circumferential groove 22 is matched with a wall surface of the third circumferential groove 22, and no tapered surface is formed.

In the third circumferential groove 22, at intersections with the extensions of the lug grooves 25 and 26 between the shoulder blocks 90, a raised portion 118 is formed on the groove bottom of a portion surrounded in three directions by the three raised portions 116, 117, and 105. In FIG. 9, the raised portion 118 is shown as a portion in the third circumferential groove 22, shaded with fine dots.

Figure 18:
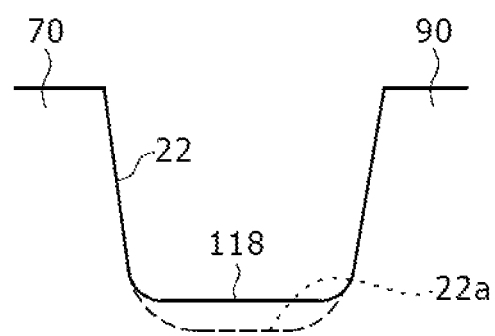
FIG. 18 is an enlarged cross-sectional view of a third raised portion on a third circumferential groove of FIG. 9.

FIG. 18 is an enlarged cross-sectional diagram of the raised portion 118 in the third circumferential groove 22. As shown in FIG. 18, similar to the raised portion 108 in the second circumferential groove 21, an upper surface of the raised portion 118 has an approximate planar shape in which a height in the up-and-down direction from the reference surface 22a of the third circumferential groove 22 is constant. Respective end edges in the tire width direction of the raised portion 118 are connected to the wall surface of the second circumferential groove 21.

With this configuration also, in the third circumferential groove 22, an amount of air accumulation at the intersection with the extension of the lug groove between the shoulder blocks 90 can be reduced. Because of this, the air pumping sound during travel can be reduced. As shown in FIG. 9, in this intersection, unlike the intersection of the second circumferential groove 21, the end of the lug groove between the shoulder blocks 90, near the second circumferential groove 21, opposes an end, of the lug groove between the mediate blocks 70 near the second circumferential groove 21, on the lines of extension of the lug grooves. Because of this, in the intersection of the third circumferential groove 22, the air tends to be more easily caused to be discharged in comparison to the intersection of the second circumferential groove 21. The advantage of providing the raised portion 108 is higher for the intersection of the second circumferential groove 21.

Figure 19:
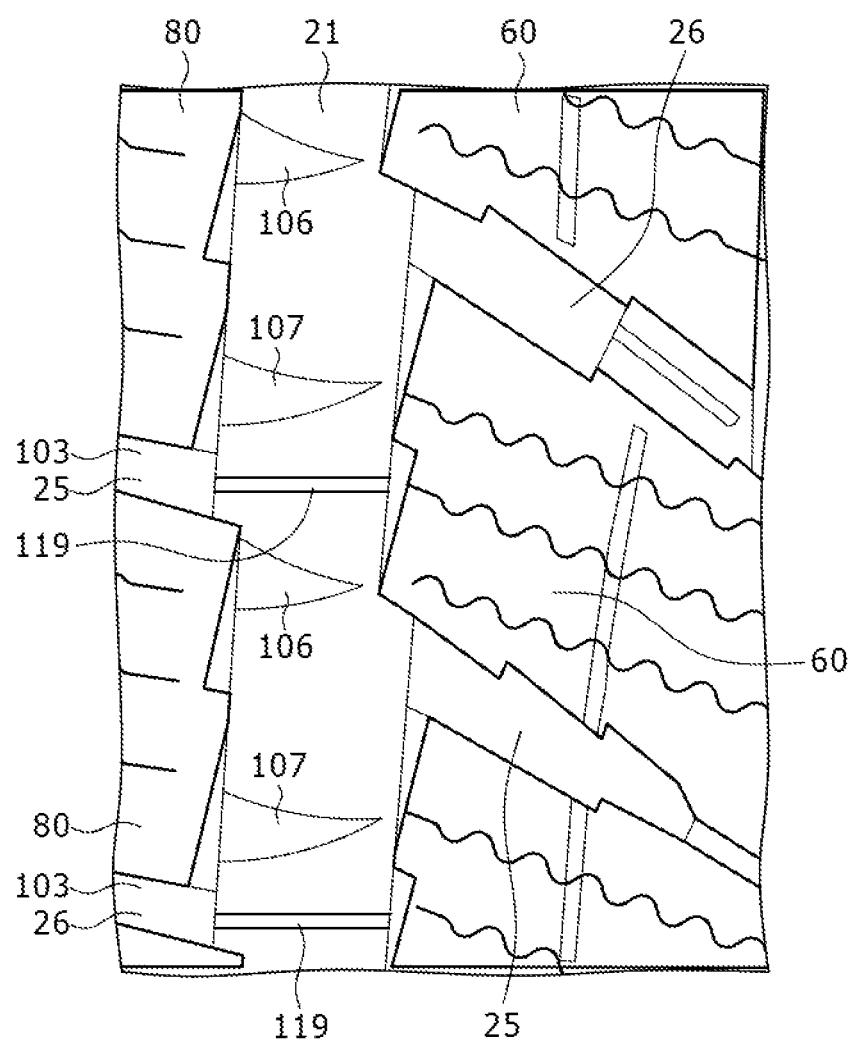
FIG. 19 is a diagram corresponding to an I part of FIG. 9, showing another configuration of the third raised portion.

FIG. 19 is a diagram showing another configuration of the third raised portion, corresponding to an I part of FIG. 9. A raised portion 119 serving as the third raised portion shown in FIG. 19 has a shape in plan view of a narrow line extending in the tire width direction, and respective ends in the tire circumferential direction are not connected to the wall surfaces of two raised portions 106 and 107. Because of this, although the advantage is inferior in comparison to the raised portion 108 of FIG. 9, the structure can achieve an advantage of reducing the volume of a space, in the second circumferential groove 21, at the intersections with the extensions of the lug grooves 25 and 26 between the shoulder blocks 80. Thus, the advantage of reduction in the air pumping sound during traveling can be achieved. In this manner, a structure may be employed in which the third raised portion is formed only at a part of the groove bottom surrounded in three directions by the two first raised portions and the second raised portion, at the intersection with the extension of the lug groove in the circumferential groove.

Figure 20:
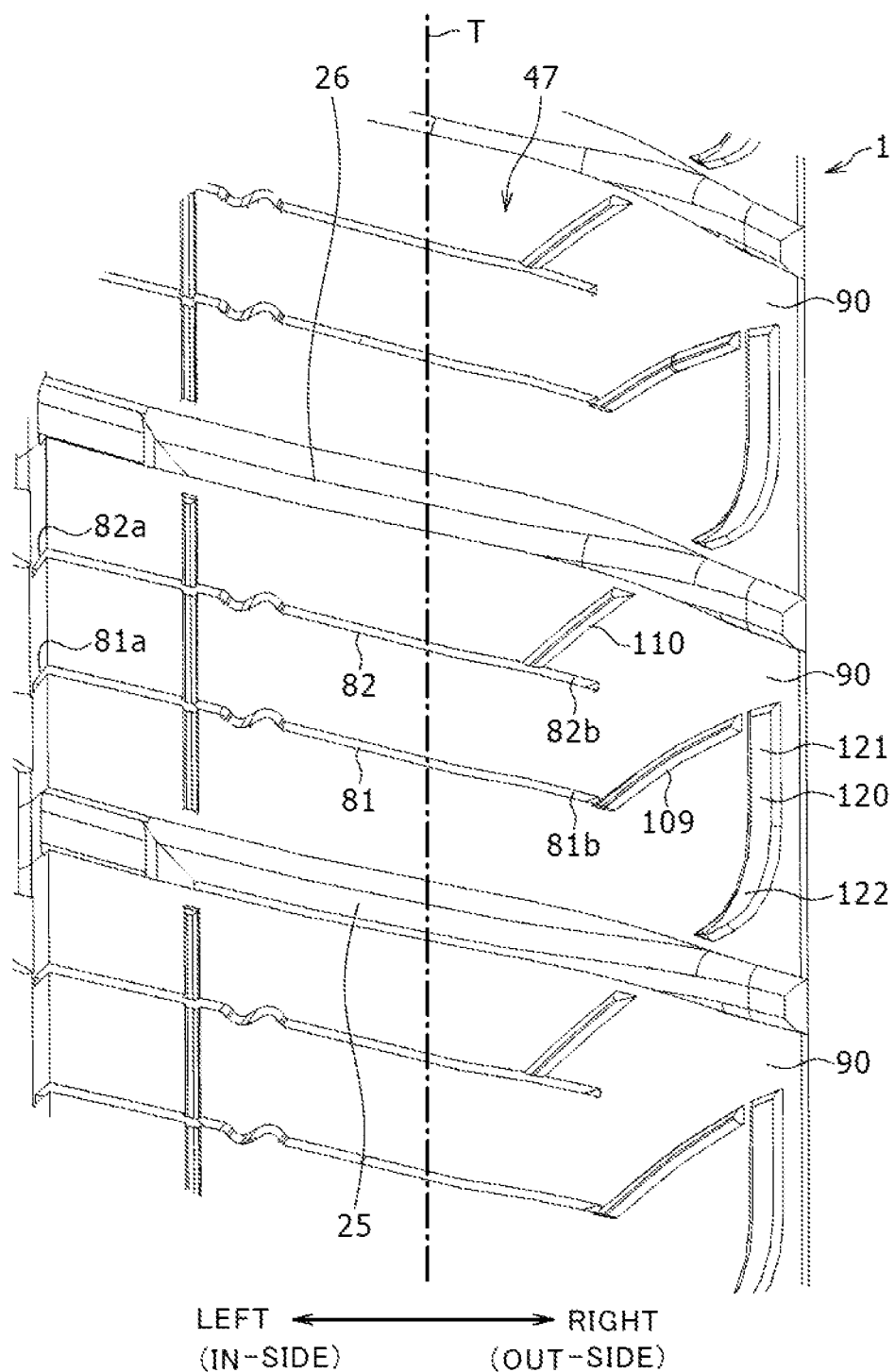
FIG. 20 is a diagram showing in an enlarged manner a part of a shoulder block which is a fifth land portion at an outer side in a vehicle width direction of FIG. 2.
Figure 21:
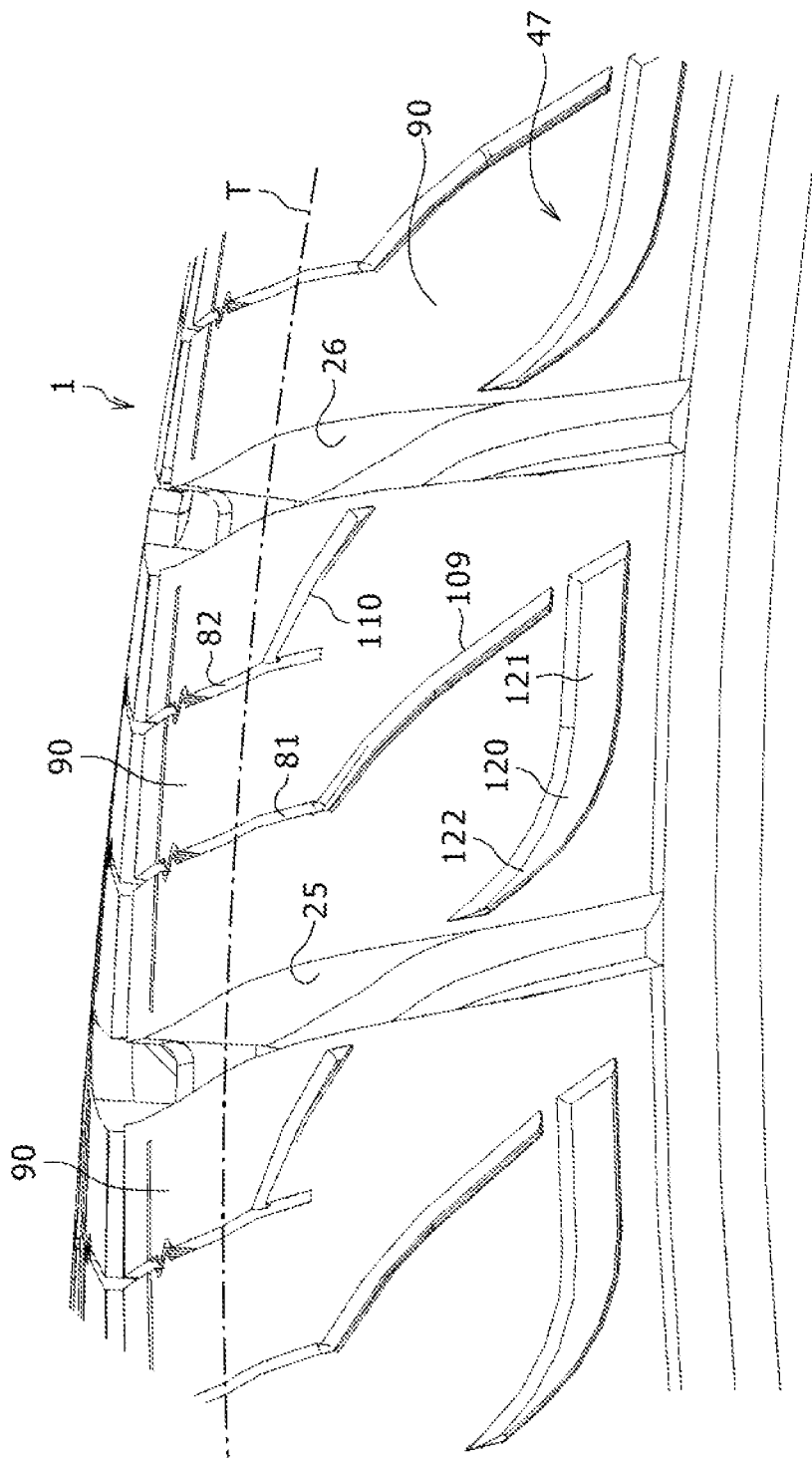
FIG. 21 is an enlarged perspective diagram of an end, of the shoulder block of FIG. 20, at an outer side in a tire width direction.
Figure 22:
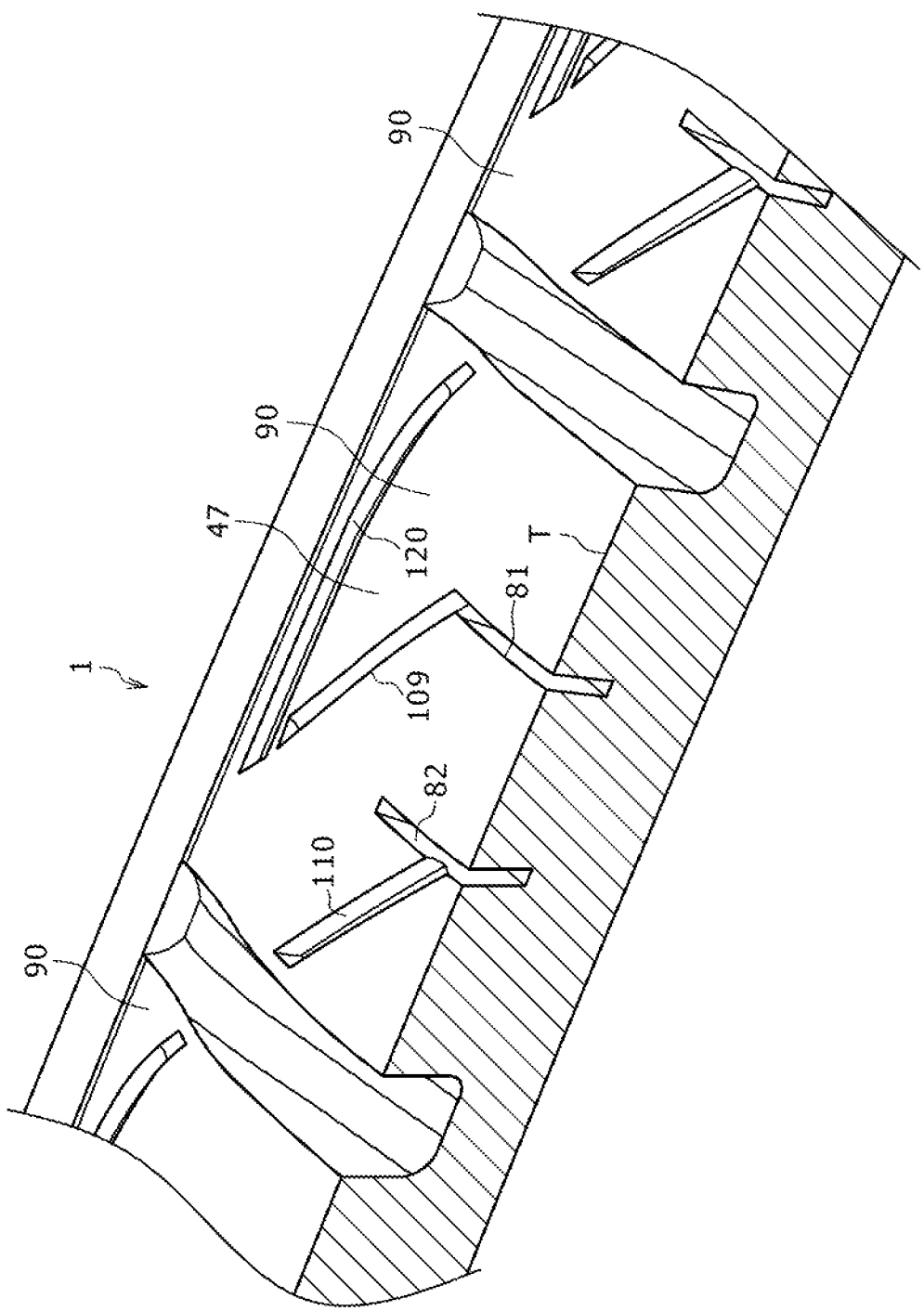
FIG. 22 is a perspective diagram showing the shoulder block of FIG. 20, cut in a plane including a ground-contacting end.

Next, narrow grooves 109 and 110 of the shoulder block 90 will be described with reference to FIGS. 20 to 22. FIG. 20 is a diagram showing in an enlarged manner a part of the shoulder block 90 shown in FIG. 2. FIG. 21 is an enlarged perspective diagram of an end of the shoulder block 90 at the outer side in the tire width direction. FIG. 22 is a perspective diagram showing the shoulder block 90, in a cut manner along a plane including the ground-contacting end T.

Between a plurality of shoulder blocks 90 of the row of shoulder blocks 47, a plurality of lug grooves 25 and 26 are formed separately in the tire circumferential direction, and extending from the left side in the tire width direction to the right side. The plurality of shoulder blocks 90 are divided in the tire circumferential direction by the lug grooves 25 and 26. The shoulder block 90 is provided at an end positioned at the outer side in the vehicle width direction when the tire 1 is fitted on the vehicle.

On the ground-contacting surfaces of the shoulder blocks 90, sipes 81 and 82 which are two lateral sipes are formed extending from the left side in the tire width direction to the right side. Each of the sipes 81 and 82 is provided between two lug grooves 25 and 26 adjacent in the tire circumferential direction. In the shoulder block 90, the sipes 81 and 82 have an equal width over the entire lengths in the longitudinal direction, and are narrower than a maximum width of the two lug grooves 25 and 26 provided at positions either side of the sipes 81 and 82.

Ends 81a and 82a which are inner ends in the tire width direction of the sipes 81 and 82 open to a wall surface of an inner end in the tire width direction of the shoulder block 90. Ends 81b and 82b which are outer ends in the tire width direction of the sipes 81 and 82 end in the shoulder block 90, and do not open to the wall surface of the shoulder block 90. A serpentine portion is provided at a part of the sipes 81 and 82, but alternatively, the serpentine portion may be omitted.

Further, in the row of shoulder blocks 47, between the two lug grooves 25 and 26 sandwiching the sipes 81 and 82, that is, at the side, of the upper surface of the shoulder block 90, that is further out in the tire width direction than the ground-contacting end T, two narrow grooves 109 and 110 inclined on the same side are formed over the entire length with respect to the tire circumferential direction. The narrow groove 109 is longer than the narrow groove 110, and an inner end in the tire width direction of the narrow groove 109 is connected to the end 81b of the sipe 81.

The narrow groove 110 is inclined on the same side as the narrow groove 109 with respect to the tire circumferential direction, toward the outer side in the tire width direction. In the narrow groove 110, an inner end in the tire width direction of the narrow groove 110 is connected to the sipe 82 in a manner to branch from the sipe 82 from a region near the outer end in the tire width direction.

The narrow grooves 109 and 110 have shallower depths than the sipes 81 and 82, and have, for example, a cross section of an arc shape and widths widened toward opening ends. The shape of the narrow groove is not limited to such a configuration, and the narrow groove may have a cross-sectional shape of an approximate quadrangle with an upper end opened, or a shape in which the wall surfaces on respective sides in the width direction are inclined with respect to the bottom surface such that the width is widened from the bottom surface which is approximately planar toward the opening end.

In addition, the narrow grooves 109 and 110 are distanced from the two lug grooves 25 and 26 which partition the respective ends of the shoulder block 90 in the tire circumferential direction over the entire length in the shoulder block 90. With this configuration, the narrow grooves 109 and 110 are not connected to the lug grooves 25 and 26 between the shoulder blocks 90.

Moreover, the outer ends in the tire width direction of the narrow grooves 109 and 110 do not open to the wall surface of the shoulder block 90, and end in the shoulder block 90. Because of this, the narrow grooves 109 and 110 do not open to the wall surface of the shoulder block 90.

Furthermore, a shallow groove 120 having a J shape in plan view is formed at a portion, at the side of the upper surface of the shoulder block 90 that is further out, in the tire width direction, than the ground-contacting end T, and positioned at the side that is further out in the tire width direction than the narrow grooves 109 and 110. The shallow groove 120 has a straight portion 121 which is positioned at the outer side in the tire width direction than a curved portion 122, and extends along the tire circumferential direction. The shallow groove 120 has approximately the same depth as the narrow grooves 109 and 110. A width of the shallow groove 120 is widened from an end, among the ends in the longitudinal direction, near the curved portion 122 toward an end near the straight portion 121.

According to the above-described structure, the narrow grooves 109 and 110 that are inclined with respect to the tire circumferential direction are formed in a region called a buttress, at the side of the shoulder block 90 that is further out in the tire width direction than the ground-contacting end T. The narrow grooves 109 and 110 are not connected to the two lug grooves 25 and 26 either side of the sipes 81 and 82 and the narrow grooves 109 and 110. With this configuration, the rigidity of the buttress can be improved, and the snow traction performance can thus be improved.

Because the narrow grooves 109 and 110 are connected to the sipes 81 and 82, the water drainage performance can be improved. In addition, because the narrow grooves 109 and 110 are inclined on the same side with respect to the tire circumferential direction over their entire lengths, lengths of the sipes 81 and 82, the depths of which can be easily enlarged, can be increased while the water drainage performance is improved by the narrow grooves 109 and 110. With this configuration, the water drainage performance of the shoulder block 90 can be improved.

In addition, because the narrow grooves 109 and 110 have shallower depths than the sipes 81 and 82, although the thickness of a rubber portion of the tire is reduced by the buttress at the outer end in the tire width direction, excessive reduction of the thickness of the bottom portions of the narrow grooves 109 and 110 can be prevented, by forming the narrow grooves 109 and 110 shallow. With this configuration, generation of cracks at the groove bottom of the narrow grooves 109 and 110 can be suppressed. In particular, the buttress tends to be exposed to sunlight, and the rubber tends to become hardened. However, even in such cases, the generation of the cracks can be easily suppressed. With this configuration, the advantages of forming the narrow grooves 109 and 110 shallow can be made more significant.

In the embodiment described above, two narrow grooves are formed in each shoulder block 90, but alternatively, only one narrow groove or three or more narrow grooves may be formed on each shoulder block.

Further, in the embodiment described above, a case has been described in which the shoulder land portion is a plurality of blocks divided by the lug grooves in the tire circumferential direction. Alternatively, a structure may be employed in which, in the shoulder land portion, the lug groove is not formed over the entire length in the tire width direction, and the shoulder land portion is not divided into a plurality of blocks in the tire circumferential direction. In this case also, a narrow groove which is inclined with respect to the tire circumferential direction over the entire length, which is connected to the lateral sipe, and which is not connected to the lug groove, may be formed at the side that is further out in the tire width direction than the ground-contacting end.

The invention claimed is:

1. A pneumatic tire comprising
a tread including: a first circumferential groove which is closest to a center in a tire width direction, among a plurality of circumferential grooves formed along a tire circumferential direction; center land portions placed adjacent to the first circumferential groove at a side near the center in the tire width direction; and a lug groove which extends from a first side in the tire width direction toward a second side between a plurality of the center land portions and which opens to a side near the first circumferential groove, wherein
the lug groove has a first side surface formed by a wall surface of a first center land portion among the center land portions on a first side in the tire circumferential direction and a second side surface formed by a wall surface of a second center land portion among the center land portions on a second side in the tire circumferential direction,
a bridge having a bottom surface which is bulged is formed at a portion of the lug groove on a side near the first circumferential groove,
the bridge has a cross-sectional shape of a trapezoid with a first tapered surface having an end near the center in a longitudinal direction and a second tapered surface having an end near the first circumferential groove,
the first tapered surface has only three edges, with an upper edge contacting an upper surface of the bridge, a first side edge contacting the first side surface of the lug groove, and a second side edge opening to the lug groove, and
the second tapered surface has only three edges, with another upper edge contacting the upper surface of the bridge, a third side edge that contacts the second side surface of the lug groove, and a fourth side edge opening to the first circumferential groove, the third side edge being higher on a side near the lug groove.

2. The pneumatic tire according to claim 1, wherein the third side edge tapers down towards the fourth side edge.

3. The pneumatic tire according to claim 2, wherein
in the lug groove, a wide-width portion having a width in the tire circumferential direction that is increased at a side nearer to the first circumferential groove than a side near the center of the lug groove, is formed on an end of the lug groove near the first circumferential groove, and
the second tapered surface being positioned at the wide-width portion.

4. The pneumatic tire according to claim 3, wherein
the bridge includes an upper surface which is inclined with respect to the tire circumferential direction, and
the upper surface is disposed between the first tapered surface and the second tapered surface.

* * * * *